US 6,715,847 B2

(12) United States Patent
Yamaguchi et al.

(10) Patent No.: US 6,715,847 B2
(45) Date of Patent: Apr. 6, 2004

(54) ROTARY PUMP WITH HIGHER DISCHARGE PRESSURE AND BRAKE APPARATUS HAVING SAME

(75) Inventors: Takahiro Yamaguchi, Kariya (JP); Tomoo Harada, Anjo (JP); Takashi Sato, Okazaki (JP); Hiroshi Kondo, Chiryu (JP); Toshihiko Kawamura, Toyoake (JP)

(73) Assignee: Denso Corporation, Kariya (JP)

( * ) Notice: Subject to any disclaimer, the term of this patent is extended or adjusted under 35 U.S.C. 154(b) by 4 days.

(21) Appl. No.: 10/053,882

(22) Filed: Jan. 24, 2002

(65) Prior Publication Data
US 2002/0095934 A1 Jul. 25, 2002

(30) Foreign Application Priority Data
Jan. 25, 2001 (JP) ........................... 2001-017264
Sep. 18, 2001 (JP) ........................... 2001-283612

(51) Int. Cl.$^7$ .............................. B60T 8/40; F01C 1/10
(52) U.S. Cl. ............................ 303/116.4; 418/171
(58) Field of Search ....................... 303/116.1, 116.4; 418/166, 171

(56) References Cited
U.S. PATENT DOCUMENTS
3,034,446 A * 5/1962 Brundage .................. 418/171
3,583,839 A * 6/1971 Brundage .................. 418/171
6,142,581 A * 11/2000 Yamaguchi et al. ..... 303/116.1

FOREIGN PATENT DOCUMENTS
JP 01-147177 A * 6/1989 .................. 418/171
JP A-10-299668 11/1998

OTHER PUBLICATIONS
U.S. patent application Ser. No. 09/412,315, Yamaguchi et al., filed Oct. 5, 1999.

* cited by examiner

Primary Examiner—Jack Lavinder
Assistant Examiner—Thomas J. Williams
(74) Attorney, Agent, or Firm—Posz & Bethards, PLC

(57) ABSTRACT

In the rotary pump, a high pressure outer circumference chamber, which is formed around an outer circumference of an outer rotor and communicates with a discharge port, presses radially inward first defined parts among the outer circumference of the outer rotor that are positioned radially outside second defined parts adjacent to teeth gap portions whose volume are largest and smallest among teeth gap portions communicating with an intake port. Teeth top clearance between the outer and inner rotors at the second defined part is reduced due to pressure difference between the discharge pressure applied to the first defined parts and the intake pressure applied to the second defined parts.

18 Claims, 13 Drawing Sheets

ROTARY PUMP WITH HIGHER DISCHARGE PRESSURE AND BRAKE APPARATUS HAVING SAME

CROSS REFERENCE TO RELATED APPLICATION

This application is based upon and claims the benefit of priority of Japanese Patent Applications No. 2001-17264 filed on Jan. 25, 2001 and No. 2001-283612 filed on Sep. 18, 2001, the contents of which are incorporated herein by reference.

BACKGROUND OF THE INVENTION

1. Field of the Invention

The present invention relates to a rotary pump with higher discharge pressure and a brake apparatus having the same.

2. Description of Related Art

A rotary pump, for example, an internal gear pump such as a trochoid pump or the like, is comprised of a drive shaft to be driven by a motor, an inner rotor and an outer rotor to be rotated by the drive shaft and a casing for containing the drive shaft and the inner and outer rotors. The inner and outer rotors contained in the casing form a plurality of teeth gap portions constituted by inner teeth portions of the outer rotor and outer teeth portions of the inner rotor which are in mesh with each other.

An intake port and a discharge port are separately disposed on opposite sides of a pump center line passing through the respective rotation axes of the inner and outer rotors. When the drive shaft is rotated for driving the pump, the inner rotor is rotated by the drive shaft on an axis of the drive shaft and, according to the rotation of the inner rotor, the outer rotor is rotated in the same direction since the inner teeth portions of the outer rotor are in mesh with the outer teeth portions of the inner rotor. As the respective volumes of the teeth gap portions between the inner and outer teeth portions are varied every turn of the rotating inner and outer rotors, fluid is sucked from the intake port and discharged to the discharge port.

In the conventional pump mentioned above, there is a drawback on producing higher discharge pressure that the fluid is likely to leak from a high pressure side to a low pressure side through a teeth top clearance between the outer and inner teeth portions at the teeth gap portion in which closed volume of brake fluid is maximum or the largest and through a teeth top clearance between the outer and inner teeth portions at the teeth gap portion in which closed volume of brake fluid is minimum or the smallest.

If each of the teeth top clearances mentioned above comes to near zero, the higher discharge pressure can be effectively produced. However, when a plenty of the pumps are manufactured through processes suitable for mass-production, it is practically difficult due to a manufacturing tolerance for all of the pumps to have dimensional accuracy to an extent that each of the teeth top clearances is always near zero. Accordingly, there inevitably exists a pump having the teeth top clearance larger than the near zero, which adversely affects on securing a target discharge pressure.

SUMMARY OF THE INVENTION

An object of the present invention is to provide a rotary pump with higher discharge pressure in which fluid leakage from the top teeth clearance between outer and inner gear portions is limited.

It is another object of the present invention to provide a brake apparatus having a hydraulic circuit in which the rotary pump mentioned above is disposed. The rotary pump is effective for increasing fluid pressure to wheel cylinders in the hydraulic circuit.

To achieve the object mentioned above, the rotary pump is composed of an outer rotor provided with inner teeth at an inner circumference thereof and an inner rotor provided with outer teeth at an outer circumference thereof so that the outer teeth is in mesh with the inner teeth so as to constitute a plurality of teeth gap portions therebetween, a drive shaft fitted to the inner rotor for rotating the inner rotor, and a casing provided with a rotor room in which the inner and outer rotors are rotatably contained with an outer circumference clearance between an inner circumferential surface of the rotor room and an outer circumferential surface of the outer rotor, and intake and discharge ports communicating respectively with the teeth gap portions that have a first closed region whose teeth gap volume is largest and a second closed region whose teeth gap volume is smallest.

With the rotary pump mentioned above, fluid is sucked from the intake port, compressed through the teeth gap portions and discharged from the discharge port when the drive shaft is driven, while fluid pressure difference between the intake and discharge ports is maintained by limiting brake fluid leakage though a teeth top clearance between the outer and inner teeth at the first and second closed regions. The outer rotor has deformation assist means for allowing the rotor to deform, when the fluid is discharged from the discharge port, so that the teeth top clearance of at least one of the first and second closed regions is more narrowed, resulting in increasing the volume efficiency and the discharge pressure of the rotary pump.

It is preferable that, as the discharge pressure is higher, the outer rotor more largely deforms.

A deforming amount of the outer rotor according to increase of the fluid discharge pressure and each amount of the teeth top clearance of the first and second closed regions at a zero fluid discharge pressure are set in advance so as to satisfy a condition, $Q > Q_L$, where $Q$ is a theoretical fluid discharge amount per rotation and $Q_L$ is a fluid leakage amount per rotation through both of the first and second closed regions.

If the amount of the teeth top clearance of the first or second closed region at a zero fluid discharge pressure is too large or the deforming amount of the outer rotor according to increase of the fluid discharge pressure (reducing amount of the teeth top clearance at the first or second closed region) is too small, $Q_L = Q$ (zero fluid discharge amount) is established in a lower discharge pressure range since the fluid leakage amount becomes too large. In this case, high fluid discharge pressure can not be obtained since the volume efficiency $\eta$ becomes 0% before reaching the turning point d, as shown by lines f or h in FIG. 4.

However, If $Q > Q_L$ is satisfied as mentioned above, the volume efficiency $\eta$ once decreases as the fluid discharge pressure increases and, then, increases as the fluid discharge pressure increases, since the volume efficiency $\eta$ has reached a turning point d before $Q_L = Q$ is established, as shown by a solid line c in FIG. 4, resulting in realizing the higher fluid discharge pressure.

In the rotary pump, the outer circumference clearance constitutes high pressure and low pressure outer circumference chambers which communicate with the discharge and intake ports, respectively. The teeth gap portions communicating with the intake port has a first low pressure teeth gap portion adjacent to the first closed region, a second low pressure teeth gap portion adjacent to the second closed region and a third low pressure teeth gap portion provided between the first and second low pressure teeth gap portions. The fluid discharge pressure of the high pressure outer circumference chamber is applied to a first outer circumference surface of the outer rotor that is positioned radially outside the first low pressure teeth gap portion and a second outer circumference surface of the outer rotor that is positioned radially outside the second low pressure teeth gap portion at the outer circumference surface of the outer rotor. Therefore, the first and second outer circumference surfaces are pressed radially inward to deform the outer rotor due to pressure difference between the high pressure outer circumference chamber and the first or second low pressure teeth gap portion.

The fluid intake pressure of the low pressure outer circumference chamber is applied to a third outer circumference surface of the outer rotor that is positioned radially outside the third low pressure teeth gap portion. Therefore, the outer rotor is easily deformable radially outward at the third outer circumference surface and radially inward at the first and second outer circumference surfaces since there is no pressure difference between the low pressure circumference chamber and the third low pressure teeth gap portion and only first and second outer circumference surfaces are pressed inward.

The outer circumference clearance is provided with sealing members for preventing the fluid from flowing between the high and low pressure outer circumference chambers.

Preferably, the deformation assist means is each hollow teeth bottom of the outer rotor so that the teeth bottom of the outer rotor is positioned radially more outside than a locus of each teeth top of the inner rotor. Therefore, a thickness between the teeth bottom of the outer rotor and the outer circumference surface thereof is thinner.

The deformation assist means may be a chamfering portion at a corner corresponding to each teeth bottom among corners constituted by the inner circumference surface of the outer rotor and the opposite axial end surfaces thereof, a recess at an axial near middle point of each teeth bottom of the outer rotor, a ring shaped groove at an axial near middle point of the outer circumferential surface, a plurality of axial through-holes provided in the outer rotor, and a plurality of round holes on opposite axial end surfaces of the outer rotor.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Preferred embodiments of the present invention are described with reference to figures attached hereto.

(First embodiment)

Figure 1:
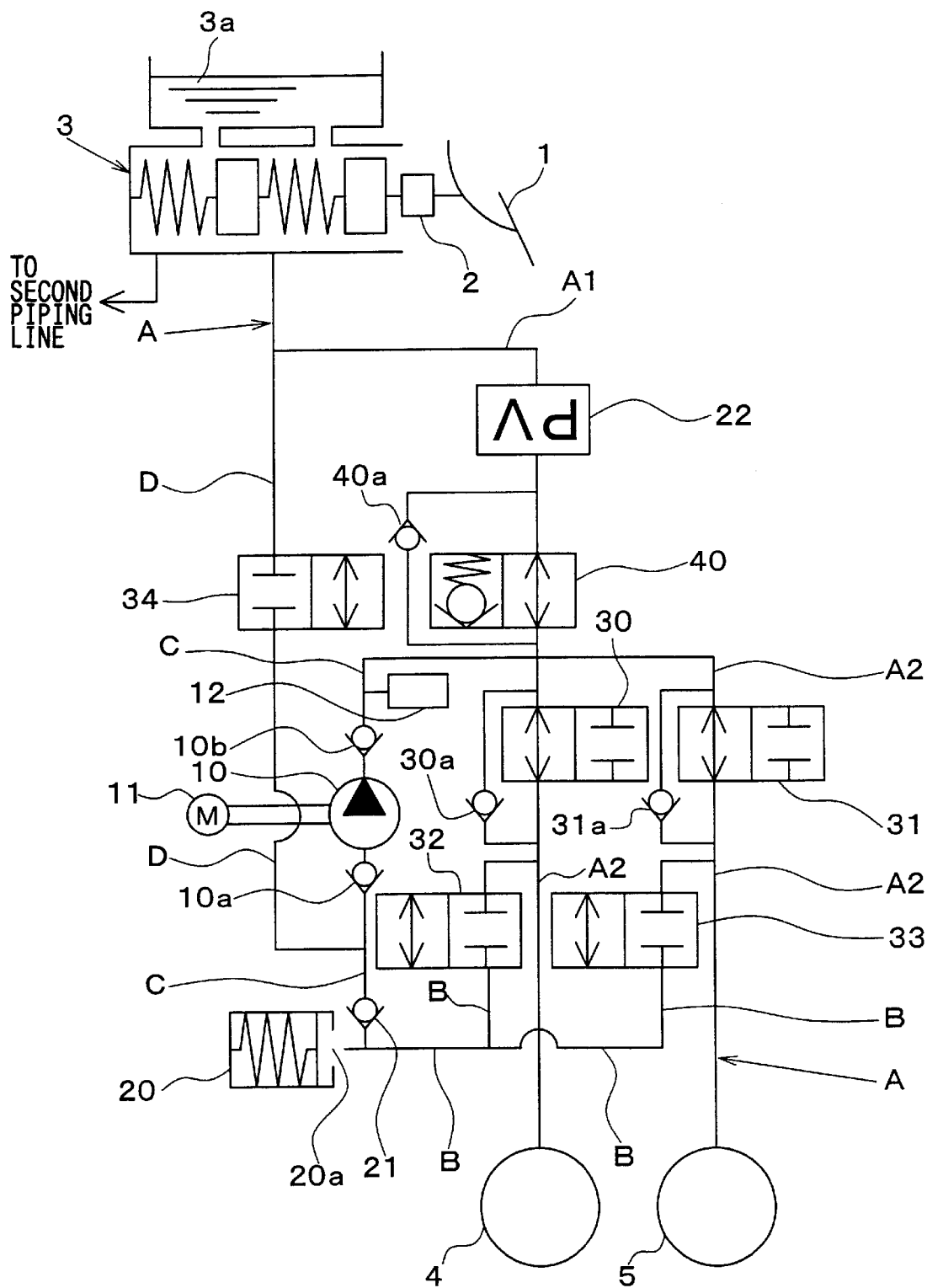
FIG. 1 is an outline of a piping system of a brake apparatus with a rotary pump according to a first embodiment.

FIG. 1 shows an outline of a piping system of a brake apparatus to which a trochoid pump as a rotary pump is applied. The basic composition of the brake apparatus will be described with reference to FIG. 1. In this embodiment, a brake apparatus is applied to a vehicle provided with a hydraulic circuit of a diagonal piping system having a first conduit connecting wheel cylinders of a front right wheel and a rear left wheel and a second conduit connecting wheel cylinders of a front left wheel and a rear right wheel. The vehicle is a four wheel vehicle of front wheel drive.

As shown in FIG. 1, a brake pedal 1 is connected to a booster 2. The booster 2 boosts brake depression force.

Further, the booster 2 is provided with a rod for transmitting boosted depression force to a master cylinder 3. The master cylinder 3 generates master cylinder pressure when the rod pushes a master piston arranged in the master cylinder 3. The brake pedal 1, the booster 2 and the master cylinder 3 correspond to a brake fluid pressure generating device. The master cylinder 3 is provided with a master reservoir 3a for supplying brake fluid into the master cylinder 3 or storing extra brake fluid of the master cylinder 3.

Further, the master cylinder pressure is transmitted to a wheel cylinder 4 for a front right wheel (FR) and a wheel cylinder 5 for a rear left wheel (RL) via a brake assist system provided with a function of an antilock brake system (hereinafter, referred to ABS). In the following explanation, the brake apparatus will be described with respect to the hydraulic circuit in the first conduit connecting the wheel cylinders of a front right wheel (FR) and a rear left wheel (RL). The explanation for the second conduit connecting the wheel cylinders of a front left wheel (FL) and a rear right wheel (RR) will be omitted since the hydraulic circuit in the second conduit is quite similar to that in the first conduit.

The brake apparatus is provided with a conduit (main conduit) A connected to the master cylinder 3. A proportioning valve (PV) 22 is disposed in the main conduit A. The main conduit A is divided into two portions by the proportioning valve 22. That is, the main conduit A is divided into a first conduit A1 extending from the master cylinder 3 to the proportioning valve 22 and a second conduit A2 extending from the proportioning valve 22 to the respective wheel cylinders 4 and 5.

The proportioning valve 22 has a function of transmitting a reference pressure of a brake fluid to the downstream side with a predetermined attenuation rate when the braking fluid flows in the positive direction. That is, by inversely connecting the proportioning valve 22 as shown in FIG. 1, pressure of the brake fluid on the side of the second conduit A2 becomes the reference pressure.

Further, the second conduit A2 branches out two conduits. A pressure increase control valve 30 for controlling an increase of brake fluid pressure of the wheel cylinder 4 is installed to one of the branched conduits and a pressure increase control valve 31 for controlling an increase of brake fluid pressure of the wheel cylinder 5 is installed to the other thereof.

The pressure increase control valve 30 or 31 is a two-position valve capable of controlling communication and shut-off states by an electronic control unit (hereinafter, referred to as the ECU). When the two-position valve is controlled to a communicating state, the master cylinder pressure or the brake fluid pressure produced by a pump 10 can be applied to the respective wheel cylinders 4 and 5.

In the normal braking operation where ABS is not controlled by the ECU, each of the pressure increase control valves 30 and 31 is always controlled in the communicating state. Safety valves 30a and 31a are installed in parallel to the pressure increase control valves 30 and 31, respectively. The safety valve 30a or 31a allows the brake fluid to swiftly return from the wheel cylinder 4 or 5 to the master cylinder 3 when ABS control has been finished by stopping depression of the brake pedal 1.

Pressure reduction control valve 32 or 33 capable of controlling communication and shut-off states by the ECU is arranged at a conduit B connecting the second conduit A2 between the pressure increase control valve 30 or 31 and the wheel cylinder 4 or 5, and a reservoir port 20a of a reservoir 20. In the normal braking operation, the pressure reduction control valves 32 and 33 are always brought into a cut-off state.

A rotary pump 10 is arranged at a conduit C connecting the reservoir hole 20a of the reservoir 20 and the second conduit A2 between the proportioning valve 22 and the pressure increase control valve 30 or 31. Safety valves 10a and 10b are disposed in the conduit C on both sides of the rotary pump 10. A motor 11 is connected to the rotary pump 10 to drive the rotary pump 10. A detailed explanation of the rotary pump 10 will be given later.

A damper 12 is arranged on the discharge side of the rotary pump 10 in the conduit C to alleviate pulsation of the brake fluid delivered by the rotary pump 10. An auxiliary conduit D is installed to connect the conduit C between the reservoir 20 and the rotary pump 10, and the master cylinder 3. The rotary pump 10 sucks the brake fluid of the first conduit A1 via the auxiliary conduit D and discharges it to the second conduit A2, whereby the brake fluid pressures of the wheel cylinders 4 and 5 are made higher than the master cylinder pressure. As a result, wheel braking forces of the wheel cylinders 4 and 5 are increased. The proportioning valve 22 works to hold the pressure difference between the master cylinder pressure and the wheel cylinder pressure.

A control valve 34 is installed in the auxiliary conduit D. The control valve 34 is always brought into cut-off state in the normal braking operation.

A check valve 21 is arranged between a connection point of the conduit C and the auxiliary conduit D and the reservoir 20 to prevent the brake fluid drawn via the auxiliary conduit D from flowing in a reverse direction to the reservoir 20.

A control valve 40 is disposed between the proportioning valve 22 and the pressure increase control valve 30 or 31 in the second conduit A2. The control valve 40 is normally controlled in communicating state. However, the control valve 40 is switched to a differential pressure producing state to hold the pressure difference between the master cylinder pressure and the wheel cylinder pressure, when the vehicle is braked in panic or traction control is carried out so that the brake fluid pressure of the wheel cylinders 4 and 5 may be controlled to become higher than the master cylinder pressure.

Figure 2:
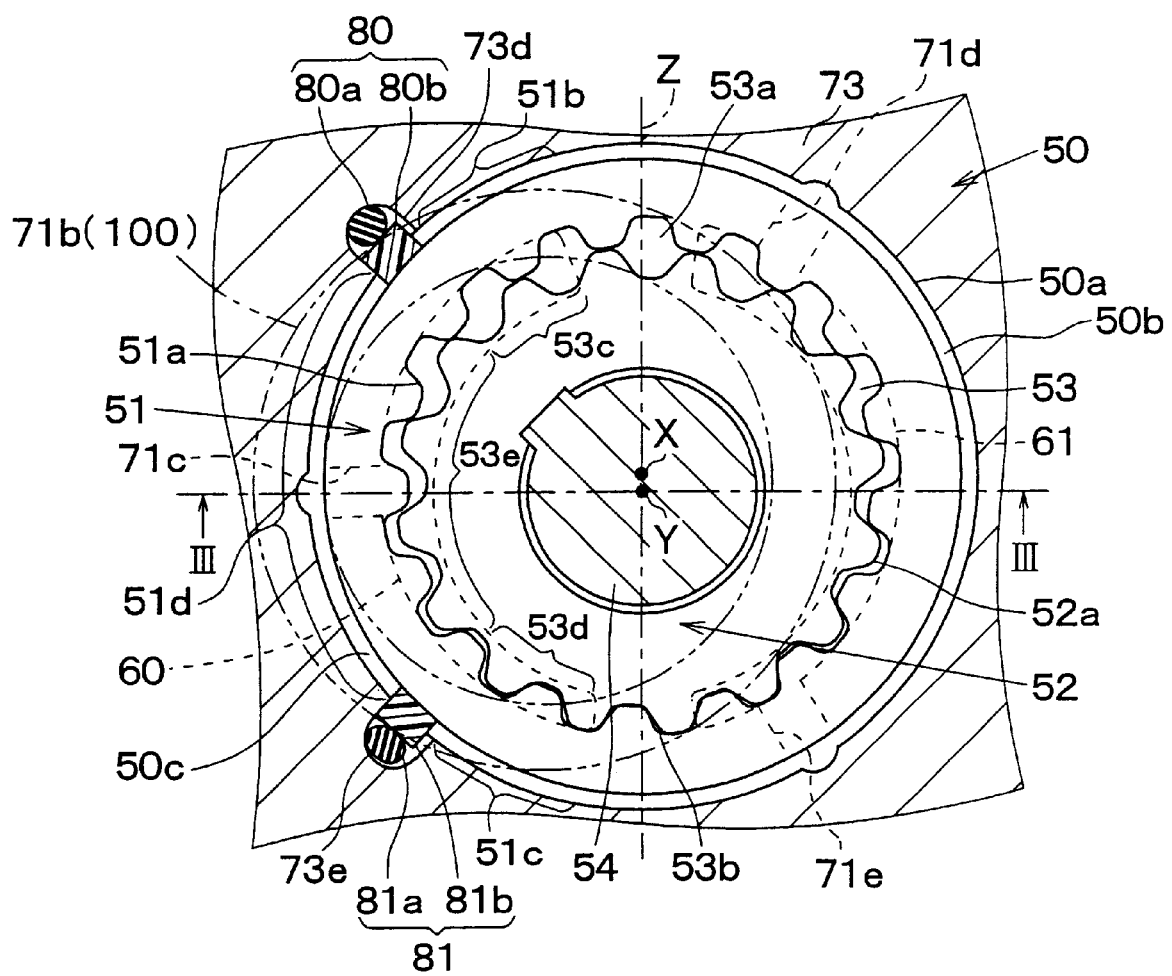
FIG. 2 is a sectional view of the rotary pump of FIG. 1.
Figure 3:
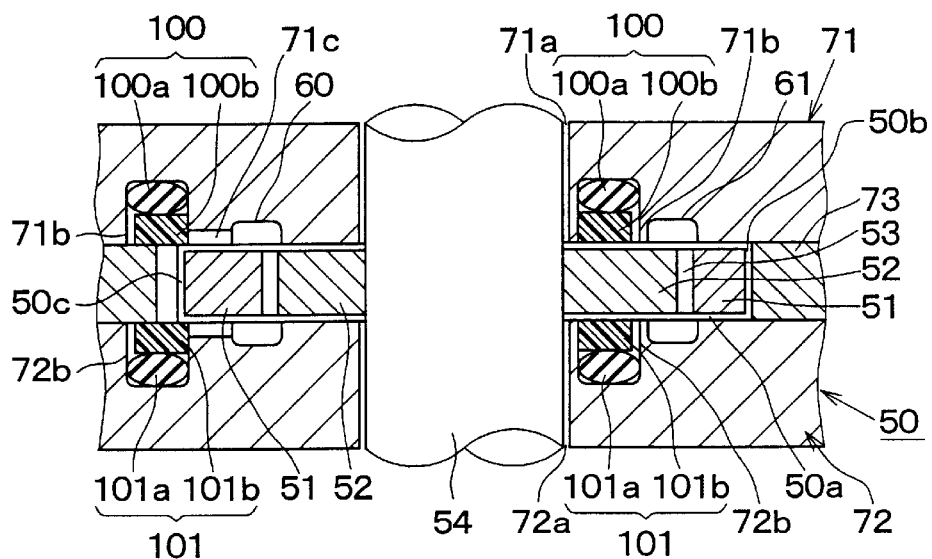
FIG. 3 is a sectional view taken along a line III—III of FIG. 2.

FIG. 2 shows a schematic sectional view of the rotary pump 10. FIG. 3 shows a sectional view taken along a line III—III of FIG. 2. First, the structure of the rotary pump 10 will be described with reference to FIGS. 2 and 3.

An outer rotor 51 and an inner rotor 52 are contained in a rotor room 50a of the casing 50 of the rotary pump 10. The outer rotor 51 and the inner rotor 52 are assembled in the casing 50 in a state where respective center axes (point X and point Y in the drawing) are shifted from each other. The outer rotor 51 is provided with an inner teeth portion 51a at its inner periphery. The inner rotor 52 is provided with an outer teeth portion 52a at its outer periphery. The inner teeth portion 51a of the outer rotor 51 and the outer teeth portion 52a of the inner rotor 52 are in mesh with each other and form a plurality of teeth gap portions 53. As is apparent from FIG. 2, the rotary pump 10 is a multiple teeth trochoid type pump having no partition plates (crescent) in which the teeth gap portions 53 are formed by the inner teeth portion 51a of the outer rotor 51 and the outer teeth portion 52a of the inner rotor 52. The inner rotor 52 and the outer rotor 51 share a plurality of contact points (that is, contact faces) at the mesh faces in order to transmit rotation torque of the inner rotor 52 to the outer rotor 51.

As shown in FIG. 3, the casing 50 is composed of a first side plate 71 and a second side plate 72 that are placed on opposite sides of the outer and inner rotors 51 and 52, and a center plate 73 placed between the first side plate 71 and the second side plate 72. The center plate 73 is provided with a bore in which the outer and inner rotors 51 and 52 are housed. The first and second side plates 71 and 72 and the center plate 73 constitute the rotor room 50a.

The first and second side plates 71 and 72 are respectively provided at their center portions with center bores 71a and 72a which communicate with the rotor room 50a. The drive shaft 54 fitted to the inner rotor 52 is housed in the center bores 71a and 72a. The outer rotor 51 and the inner rotor 52 are rotatably arranged in the bore of the center plate 73. That is, a rotating unit constituted by the outer rotor 51 and the inner rotor 52 is rotatably contained in the rotor room 50a of the casing 50. The outer rotor 51 rotates with a point X as a rotation axis and the inner rotor 52 rotates with a point Y as a rotation axis.

When a line running on both point X and point Y respectively corresponding to the rotation axes of the outer rotor 51 and the inner rotor 52 is defined as a center line Z of the rotary pump 10, the intake port 60 and the discharge port 61 both of which communicate with the rotor room 50a are formed on the left and right sides of the center line Z in the first and second side plates 71 and 72. The intake port 60 and the discharge port 61 are arranged respectively at positions communicating with a plurality of teeth gap portions 53. The brake fluid from outside can be sucked into the teeth gap portions 53 via the intake port 60 and the brake fluid in the teeth gap portions 53 can be discharged to outside via the discharge port 61.

There exist a maximum volume teeth gap portion where the brake fluid volume is the largest and a minimum volume teeth gap portion where the brake fluid volume is the smallest among the plurality of the teeth gap portions 53. First and second closed regions 53a and 53b, which are the maximum and minimum volume teeth gap portions, respectively, communicate neither with the intake port 60 nor with the discharge port 61. The first and second closed regions 53a and 53b serve to hold the pressure difference between the intake pressure at the intake port 60 and the discharge pressure at the discharge port 61.

A ring shaped space is formed between the outer circumference of the outer rotor 51 and the inner circumference of the center plate 73. The ring shaped space is divided into two spaces constituting a high pressure outer circumference chamber 50b and a low pressure outer circumference chamber 50c by first and second outer circumference sealing members 80 and 81 (described in detail later).

The first side plate 71 is provided with a low pressure communicating path 71c for communicating the low pressure outer circumference chamber 50c with the intake port 60, and first and second high pressure communicating paths 71d and 71e for communicating the high pressure outer circumference chamber 50b with the discharge port 61. The communicating path 71c is arranged at a position advanced in a direction from the center line Z to the intake port 60 by an angle of about 90 degrees centering on the point X constituting the rotation axis of the outer rotor 51.

The first high pressure communicating path 71d is formed to cause the teeth gap portion 53, which is most adjacent to the first closed region 53a among the plurality of teeth gap portions 53 communicating with the discharge port 61, to communicate with the high pressure outer circumference chamber 50b. The second high pressure communicating path 71e is formed to cause the teeth gap portion 53, which is most adjacent to the second closed region 53b among the plurality of teeth gap portions 53 communicating with the discharge port 61, to communicate with the high pressure outer circumference chamber 50b. Specifically, the first and second high pressure communicating paths 71d and 71e are arranged respectively at positions advanced in right and left directions from the center line Z to the discharge port 61 by an angle of about 22.5 degrees centering on the point X.

Recessed portions 73d and 73e are formed on an inner wall of the bore of the center plate 73 at positions advanced in the left and right directions, respectively, from the center line Z to the intake port 60 by an angle of about 45 degrees centering on the point X constituting the rotation axis of the outer rotor 51. The first and second outer circumference sealing members 80 and 81 are respectively installed in the recessed portions 73a and 73b to restrain the brake fluid from flowing from the high pressure outer circumference chamber 50b to the low pressure outer circumference chamber 50c.

The first outer circumference sealing members 80 is arranged at an intermediate point between the low pressure communicating path 71c and the first high pressure communicating path 71d and radially outside the intake port 60. Accordingly, the high pressure outer circumference chamber 50b extends until a position radially outside a first low pressure teeth gap portion 53c adjacent to the first closed region 53a among the plurality of teeth gap portions 53 communicating with the intake port 60. Therefore, the discharge pressure is applied to a first outer circumference surface 51b that is positioned radially outside the first low pressure teeth gap portion 53c at the outer circumference surface of the outer rotor 51.

The second outer circumference sealing members 81 is arranged at an intermediate point between the low pressure communicating path 71c and the second high pressure communicating path 71e and radially outside the intake port 60. Accordingly, the high pressure outer circumference chamber 50b extends until a position radially outside a second low pressure teeth gap portion 53d adjacent to the second closed region 53b among the plurality of teeth gap portions 53 communicating with the intake port 60. Therefore, the discharge pressure is applied to a second outer circumference surface 51c that is positioned radially outside the second low pressure teeth gap portion 53d at the outer circumference surface of the outer rotor 51.

The low pressure outer circumference chamber 50c is positioned radially outside a third low pressure teeth gap portion 53e except the first and second low pressure teeth gap portions 53c and 53d among the teeth gap portions 53 communicating with the intake port 60. The intake pressure is applied to a third outer circumference surface 51d that is positioned radially outside the third low pressure teeth gap portion 53e at the outer circumference surface of the outer rotor 51.

The first or second outer circumference sealing member 80 or 81 is constituted by a spherical or cylindrical rubber element 80a or 81a and a rectangular shaped resin element 80b or 81b. The resin element 80b or 81b is made of PTFE, PTFE containing carbon fiber or PTFE containing graphite. The resin element 80b or 81b is biased or pressed by the rubber element 80a or 81a to be brought into contact with the outer rotor 51. That is, as the dimensional deviation of the outer rotor 51 due to manufacturing errors or the like is inevitable, the rubber element 80a or 81a having elastic force can absorb the dimensional deviation.

A width of the resin element 80b or 81b is shorter than that of the recessed portion 73d or 73e so that there may exist a gap to a certain extent in a rotating direction of the outer rotor 51 when the resin element 80b or 81b is housed in the recessed portion 73d or 73e. That is, in case that the width of the resin element 80b or 81b is equal to that of the recessed portion 73d or 73e, the resin element 80b or 81b is unlikely to go out of the recessed portion 73d or 73e, once the resin element 80b or 81b is pushed into the recessed portion 73d or 73e by pressurized brake fluid flow upon driving the pump. However, in case that the resin element 80b or 81b is housed with a gap to some degree in the recessed portion 73d or 73e so that the brake fluid may enter into on a side of the rubber element 80a or 81a with respect to the resin member 80b or 81b, the resin member 80b or 81b goes easily out of the recessed portion 73d or 73e as the pressure of the brake fluid acts back and forth on the resin element 80b or 81b.

As shown in FIG. 3, the first and second side plates 71 and 72 are provided respectively with grooved portions 71b and 72b. Each of the grooved portion 71b, 72b is shaped a ring surrounding the drive shaft 54, as shown by a two dots-dash line in FIG. 3. In more detail, the center of the grooved portion 71b or 72b is positioned eccentrically on a side of the intake port 60(on a left side of the drawing) with respect to the axial center of the drive shaft 54. The grooved portion 71b or 72b passes through a portion between the discharge port 61 and the drive shaft 54, the first closed region 53a and the second closed region 53b and portions where the first and second outer circumference sealing members 80 and 81 seal the outer circumference of the outer rotor 51.

Side sealing members 100 and 101 are housed respectively in the grooved portions 71b and 72b. The side sealing member 100 or 101 is composed of an o-ring 101a or 101a and a ring shaped resin element 100b or 101b. The resin element 100b or 101b is arranged to be in contact with the inner rotor 52, the outer rotor 51 and the center plate 73 and, for performing the sealing function, biased by the o-ring 100a or 101a placed on a bottom side of the grooved portion 71b or 72b with respect to the resin element 100b or 101b. The resin element 100b or 101b is made of PEEK or PEEK containing carbon which is harder than material of the resin element 80b or 81b.

As mentioned above, the side sealing members 100 and 101 serve to seal the brake fluid communication between the high pressure discharge port 61 and the low pressure clearance between the drive shaft 54 and the inner rotor 52 or the low pressure intake port 60 through respective clearances between the axial end surfaces of the inner and outer rotors 52 and 51 and the first and second side plates 71 and 72.

To seal effectively the clearances between the axial end surfaces of the inner and outer rotors 52 and 51 and the first and second side plates 71 and 72, each of the side sealing members 100 and 101 extends from the first outer circumference sealing member 80 at the outer circumference of the outer rotor 51, via the first closed region 53a, a portion between the discharge port 61 and the drive shaft 54, the second closed region 53b, to the second outer circumference sealing member 81 at the outer circumference of the outer rotor 51. As the side sealing member 100 or 101 seals only portions necessary for restraining the brake fluid leakage between high and low pressure portions and, therefore, is in less contact with the outer and inner rotors 51 and 52, the contact resistance of the side sealing member 100 or 101 is smaller so that the mechanical loss may be limited.

Next, an explanation will be given of operations of the brake apparatus and the rotary pump 10.

The control valve 34 provided in the brake apparatus is pertinently brought into a communicating state when high pressure brake fluid needs to be supplied to the wheel cylinders 4 and 5, for example, when braking force in correspondence with depressing force of the brake pedal 1 cannot be obtained or when an operating amount of the braking pedal 1 is large. When the control valve 34 is switched to the communicating state, the master cylinder pressure generated by depressing the brake pedal 1 is applied to the rotary pump 10 via the auxiliary conduit D.

In the rotary pump 10, the inner rotor 52 is rotated in accordance with rotation of the drive shaft 54 by driving the motor 11. In response to rotation of the inner rotor 52, the outer rotor 51 is also rotated in the same direction as the inner teeth portion 51a is in mesh with the outer teeth portion 52a. At this time, each volume of the teeth gap portions 53 is changed from large to small or vice versa during a cycle in which the outer rotor 51 and the inner rotor 52 make one turn. Therefore, the brake fluid is sucked from the intake port 60 and is discharged from the discharge port 61 to the second conduit A2. Pressures of the wheel cylinders can be increased using the discharged brake fluid.

In this way, the rotary pump 10 can carry out a basic pumping operation in which the brake fluid is sucked from the intake port 60 and is discharged from the discharge port 61 by rotation of the outer and inner rotors 51 and 52.

During the pumping operation, the low pressure outer circumference chamber 50c is under intake pressure by brake fluid to be sucked through the low pressure communicating path 71c and the high pressure outer circumference chamber 50b is under discharge pressure by brake fluid to be discharged through the high pressure communicating paths 71d and 71e. Therefore, at the outer circumference of the outer rotor 51, the pressure difference exists between the low pressure portion communicating to the intake port 60 and the high pressure portion communicating to the discharge port 61. Further, at the clearance between the axial end surfaces of the outer and inner rotors 51 and 52 and the first and second side plates 71 and 72, there exist both high and low pressure portions caused by the intake port 60 at low pressure, the clearance at low pressure between the drive shaft 54 and the inner rotor 52, and the discharge port 61 at high pressure.

However, the brake fluid leakage from the high pressure portion on the side of the discharge port 61 to the low pressure portion on the side of the intake port 60 at the outer circumference of the outer rotor 51 is prevented by the outer circumference sealing members 80 and 81 that seal between the high and low pressure outer circumference chambers 50b and 50c. Further, the side sealing members 100 and 101 seal the brake fluid leakage from the high pressure portion to the low pressure portion at the clearance between the axial end surfaces of the inner and outer rotors 52 and 51 and the first and second side plates 71 and 72. Furthermore, as the side sealing member 100 or 101 passes through the outer circumference sealing member 80 or 81, there is no gap between the side sealing member 100 or 101 and the outer circumference sealing members 80 or 81 so that the brake fluid leakage from this gap may be restrained.

The outer circumference sealing members 80 and 81 are so operative that the low pressure outer circumference chamber 50c may be exposed to low pressure which is same to the pressure of the teeth gap portions 53 communicating with the intake port 60 and the high pressure outer circumference chamber 50b may be exposed to high pressure which is same to the pressure of the teeth gap portions 53 communicating with the discharge port 61. As a result, pressures at the outer and inner circumferences of the outer rotor 51 are balanced so that the pump operation may become stable.

As mentioned above, since the outer circumference sealing members 80 and 81, which seal between the high and low pressure outer circumference chambers 50b and 50c, are positioned radially outside the intake port 60, the first outer circumference surface 51b, which is positioned radially outside the first low pressure teeth gap portion 53c at the outer circumference of the outer rotor 51, and the second outer circumference surface 51c, which is positioned radially outside the second low pressure teeth gap portion 53d at the outer circumference of the outer rotor 51, may be disposed to the discharge high pressure.

Therefore, portions of the outer rotor 51 corresponding to the first and second outer circumference surfaces 51b and 51c are pressed and deformed radially inward due to pressure difference between the high pressure outer circumference chamber 50b and the first or second low pressure teeth gap portion 53c or 53d. Accordingly, a teeth top clearance between the inner teeth portion 51a of the outer rotor 51 and the outer teeth portion 52a of the inner rotor 52 (hereinafter called first closed region teeth top clearance) may be diminished, thus preventing or reducing the brake fluid leakage from the first closed region teeth top clearance.

Figure 4:
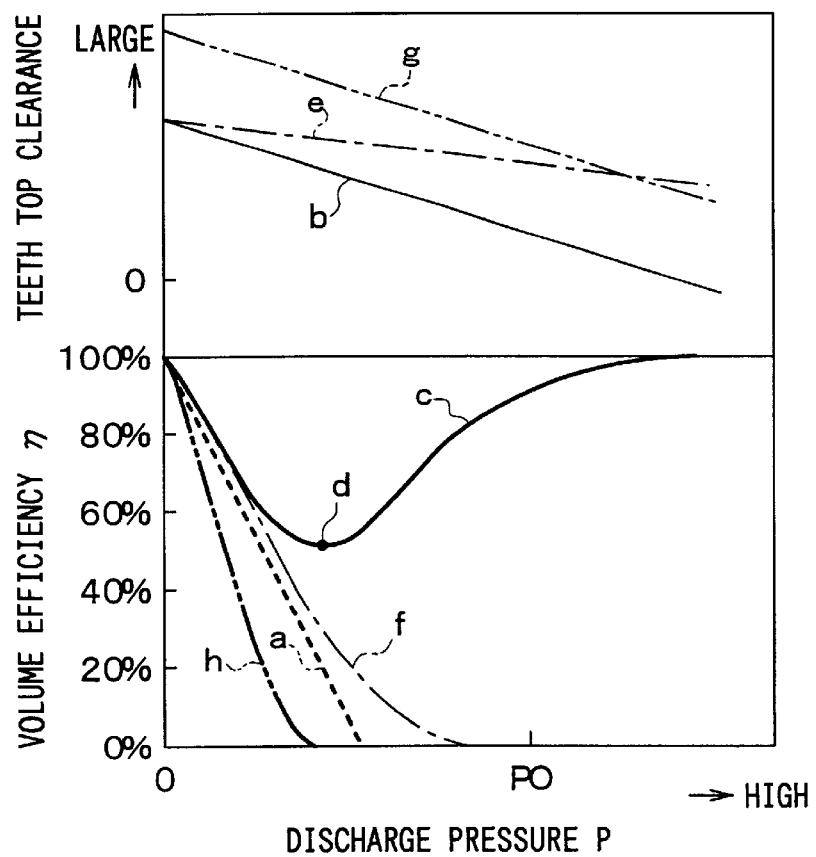
FIG. 4 is a chart showing a relationship between a teeth top clearance or a volume efficiency and discharge pressure.

FIG. 4 shows changes of the first closed region teeth top clearance and characteristics of volume efficiency η with respect to discharge pressure P. The volume efficiency is expressed as follows; η=QM/Q, where QM is an actual fluid discharge amount per each turn of a rotor portion constituted by the outer and inner rotors 51 and 52 and Q is a theoretical fluid discharge amount per each turn of the rotor portion.

Since the outer circumference sealing members 80 and 81 and the side sealing members 100 and 101 are in sealing contact with the outer circumference surface of the outer rotor 51 and the axial end surfaces of the outer and inner rotors 51 and 52, respectively, an amount of fluid leakage from the high pressure side to the low pressure side through the outer circumference surface of the outer rotor 51 and through the axial end surfaces of the outer and inner rotors 51 and 52 is a smaller value that is negligible, compared to that through the first closed region teeth top clearance.

If the fluid leakage amount through the first closed region teeth top clearance during each turn of the rotor portion is represented as QL, the actual fluid leakage amount is expressed as QM=Q−QL. In the rotary pump according to the first embodiment, the volume efficiency η and the fluid discharge pressure are higher as the fluid leakage amount QL is smaller.

In a case of the conventional pump where the first closed region teeth top clearance is substantially constant, the volume efficiency η decreases substantially in a straight line according to the increase of the fluid discharge pressure P, as shown by a broken line a in FIG. 4. Accordingly, the conventional pump can't achieve a target fluid discharge pressure P0 unless the pump is manufactured with higher dimensional accuracy so as to secure a sufficiently small first closed region teeth top clearance.

In the pump according to the first embodiment, the first closed region teeth top clearance decreases substantially in a straight line so as to reduce the fluid leakage amount QL according to the increase of fluid discharge pressure P, as shown by a solid line b in FIG. 4, due to a deformation of the outer rotor 51 caused by the pressure difference between the high pressure outer circumference chamber 50b and the first or second low pressure teeth gap portion 53c or 53d.

In a range where the fluid discharge pressure P is relatively low, a decrease amount of the fluid leakage amount QL is small since a decrease amount of the first closed region teeth top clearance is small. Accordingly, the fluid leakage amount QL increases as the fluid discharge pressure P increases. However, in a range where the fluid discharge pressure P is relatively high, the fluid leakage amount QL decreases as the fluid discharge pressure P increases since the first closed region teeth top clearance becomes sufficiently small and, when the fluid discharge pressure P has sufficiently increased so that the first closed region teeth top clearance reaches zero, the fluid leakage amount QL becomes zero.

Therefore, after the volume efficiency η once decreases as the fluid discharge pressure P increases, the volume efficiency η increases as the fluid discharge pressure P increases, as shown by a solid line c in FIG. 4, so that the target fluid discharge pressure P0 can be attained. The characteristic curve of the volume efficiency η shown in FIG. 4 has a turning point d at which the volume efficiency η is changed from decreasing to increasing.

In a case that the decrease amount of the first closed region teeth top clearance in response to the increase of the fluid discharge pressure P is set to a small value, the decrease of the fluid leakage amount QL due to the decrease of the first closed region teeth top clearance is still small since the first closed region teeth top clearance is not sufficiently small even if the fluid discharge pressure P is relatively high. Accordingly, QL=Q (theoretical fluid discharge amount) and QM (actual fluid discharge amount)=0 are established in the pressure range lower than the target fluid discharge pressure P0, failing to attain the target fluid discharge pressure P0 since the volume efficiency η becomes 0% before reaching the turning point d, as shown by a dot-slash line f in FIG. 4.

Further, as shown by a two dots-slash line g in FIG. 4, in a case that the first closed region teeth top clearance in a state that the fluid discharge pressure P is zero (hereinafter called first closed region initial teeth top clearance) is set to a relatively large value, QL=Q is established in the pressure range lower than the target fluid discharge pressure P0, even if the first closed region teeth top clearance decreases as the fluid discharge pressure P increases, since the fluid leakage amount QL is too large in such a lower pressure range. Accordingly, the volume efficiency η becomes 0% before reaching the turning point d, as shown by a two dots-slash line h in FIG. 4 so that the target fluid discharge pressure P0 is never attained.

As a result of the study mentioned above, it is concluded that the target fluid discharge pressure P0 can be attained, if a deforming amount of the outer rotor 51 responsive to the increase of the fluid discharge pressure P (a decrease amount of the first closed region teeth top clearance responsive to the increase of the fluid discharge pressure P) and the first closed region initial teeth top clearance are properly set so that the volume efficiency η reaches the turning point d in a pressure range lower than the fluid discharge pressure P0, that is, the fluid leakage amount QL is smaller than the theoretical fluid leakage amount Q (QL<Q) in a pressure range lower than the fluid discharge pressure P0.

The deforming amount of the outer rotor 51 responsive to the increase of the fluid discharge pressure P can be adjusted by adequately setting a radial thickness of the outer rotor 51 (length between a teeth bottom of the inner teeth portion 51a and an outer circumference surface thereof), each circumferential length of the first and second outer circumference surfaces 51b and 51c of the outer rotor 51 or the like.

Next, experimental test results of the rotary pump according to the first embodiment will be described.

Figure 5:
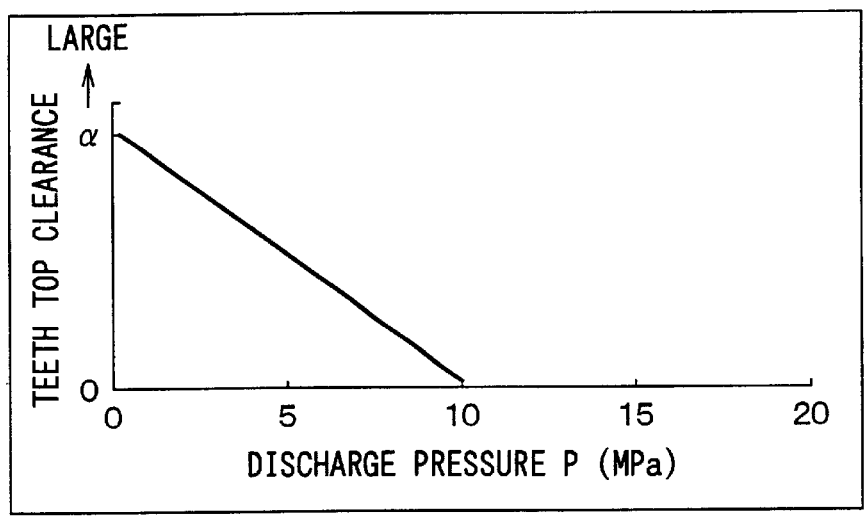
FIG. 5 is a chart showing calculation values of the teeth top clearance of the pump used in the experimental test.
Figure 6:
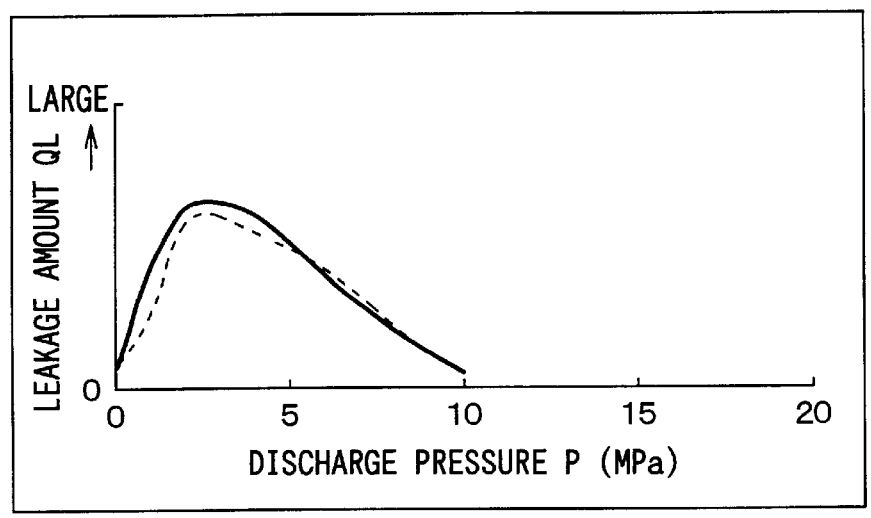
FIG. 6 is a chart showing measurement and calculation values of the fluid leakage amount from the teeth top clearance of the pump used in the experimental test.
Figure 7:
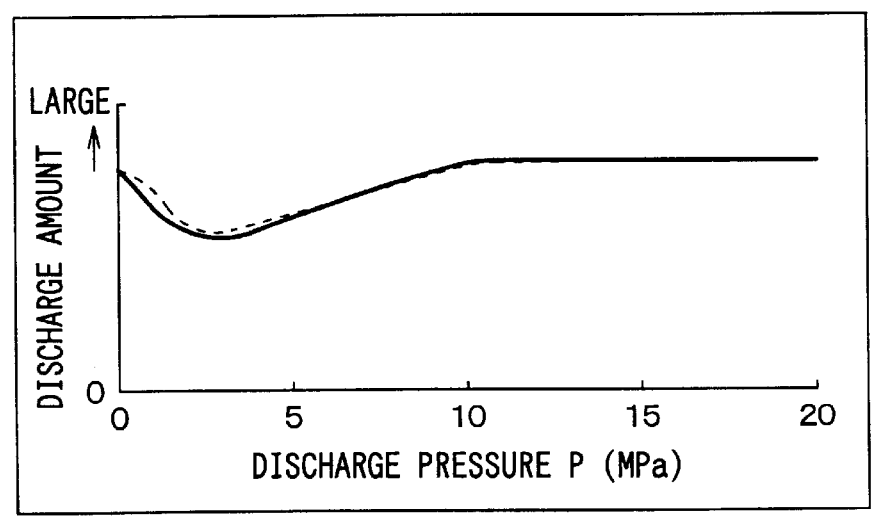
FIG. 7 is a chart showing measurement and calculation values of the fluid discharge amount of the pump used in the experimental test.

FIG. 5 shows calculation values of the first closed region teeth top clearance based on specifications of the pump used in the experimental test. FIG. 6 shows measurement and calculation values of the fluid leakage amount from the first closed region teeth top clearance. FIG. 7 shows measurement and calculation values of the fluid discharge amount. Solid and broken lines in FIGS. 6 and 7 show the calculation values and the measurement values, respectively.

The specifications of the pump used in the experimental test are defined on condition that the target fluid discharge pressure P0 is 20 Mpa. The first closed region initial teeth top clearance is $\alpha \mu m$. The diameter of the teeth bottom circle of the outer rotor 51 is $\phi 18$ mm. The diameter of the outer circumference surface of the outer rotor 51 is $\phi 22$ mm. The first and second outer circumference sealing members 80 and 81 are arranged at positions advanced in left and right directions from the center line Z to the intake port 60 by an angle of about 45 degrees centering on the point X, respectively. According to the specifications set forth, it is presumed that the first closed region teeth top clearance becomes zero when the fluid discharge pressure is about 10 Mpa, as shown in FIG. 5.

As shown in FIGS. 6 and 7, the measurement values coincides with the calculation values. In more detail, the fluid leakage amount QL increases and the fluid discharge amount decreases according to the increase of the fluid discharge pressure P when the fluid discharge pressure P increases from zero to about 2 Mpa. The fluid leakage amount QL decreases and the fluid discharge amount increases when the fluid discharge pressure P further increases beyond the about 2 Mpa. When the fluid discharge pressure reaches about 10 Mpa, at which the first closed region teeth top clearance is presumably zero, the fluid leakage amount QL becomes about zero. Accordingly, even when the fluid discharge pressure is more than about 10 MPa and, further, reaches 20 MPa, sufficient fluid discharge amount can be attained.

The above description of the first embodiment is made on the presumption that the teeth top clearance between the inner and outer teeth portions 51a and 52a at the second closed region 53b (hereinafter called second closed region teeth top clearance) is zero and there is no brake fluid leakage through second closed region teeth top clearance.

However, due to a variety of assembly conditions of pump component parts, there is a case that the first closed region initial teeth top clearance is zero and the second closed region teeth top clearance when the fluid discharge pressure P (hereinafter called second closed region initial teeth top clearance) is not zero. In this case, the first and second outer circumference surfaces 51b and 51c of the outer rotor 51 are pressed and deformed radially inward according to the increase of the fluid discharge pressure so that the second closed region teeth top clearance decreases and the brake fluid leakage through the second closed region teeth top clearance is prevented or reduced.

Further, due to another variety of assembly conditions of pump component parts, there is another case that both of the first and second closed region initial teeth top clearances are not zero. In this case, the first and second outer circumference surfaces 51b and 51c of the outer rotor 51 are pressed and deformed radially inward according to the increase of the fluid discharge pressure so that both of the first and second closed region teeth top clearances decrease and the brake fluid leakage through the first and second closed region teeth top clearances is prevented or reduced.

In another words, according to the pump of the first embodiment, when one clearance of the first and second closed region initial teeth top clearances is not zero, the one clearance is reduced by the deformation of the outer rotor 51 due to the increase of the fluid discharge pressure and, when both clearances of the first and second closed region initial teeth top clearances are not zero, the both clearance are reduced by the deformation of the outer rotor 51 due to the increase of the fluid discharge pressure.

(Second embodiment)

Figure 8:
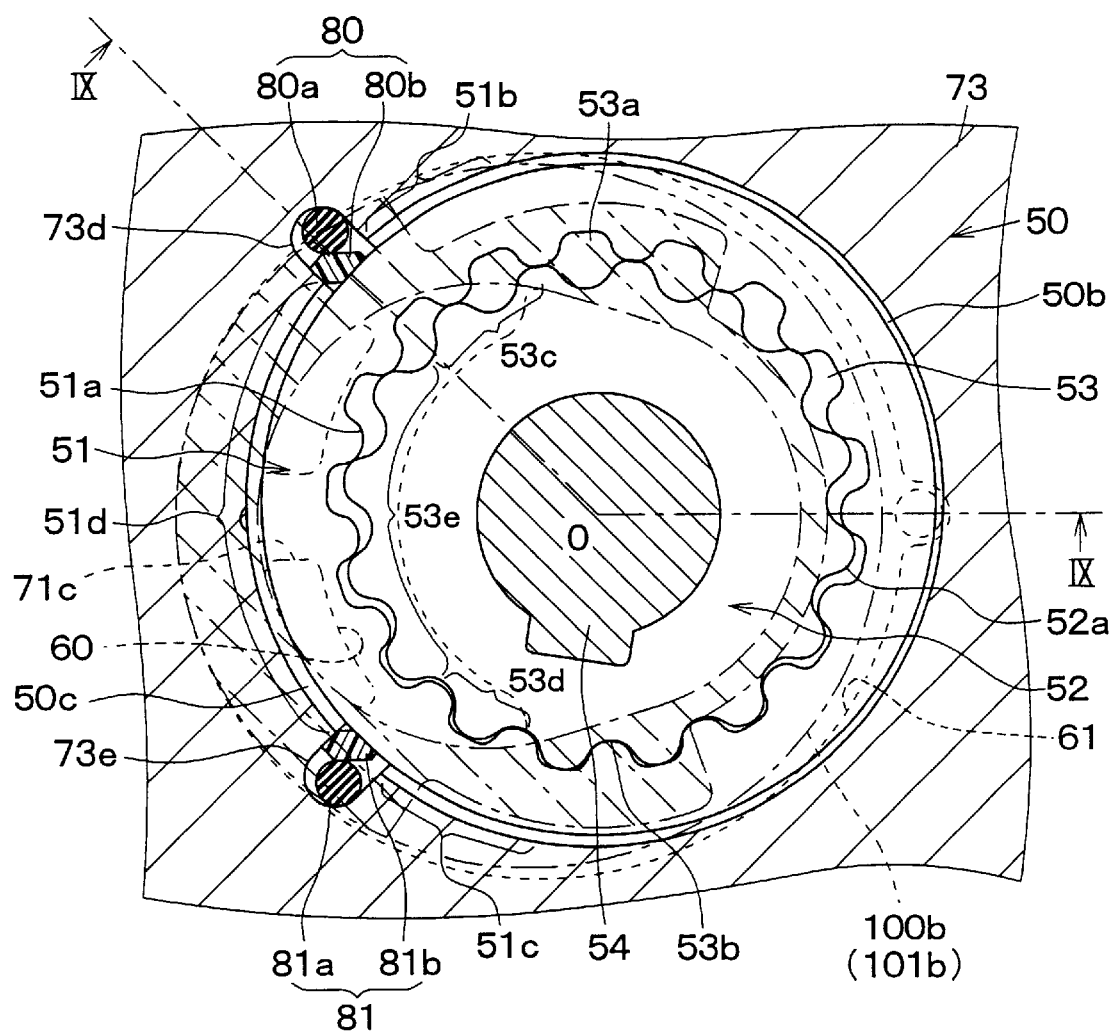
FIG. 8 is a schematic sectional view of a totary pump according to a second embodiment of the present invention.
Figure 9:
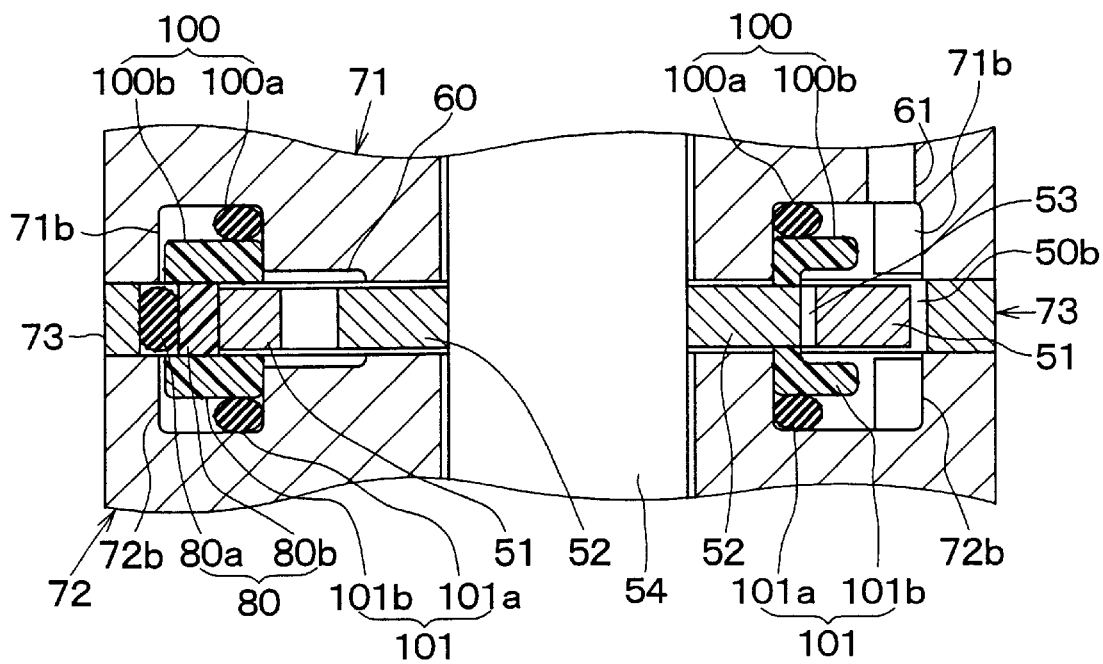
FIG. 9 is a cross sectional view taken along a line IX—IX of FIG. 8.
Figure 10:
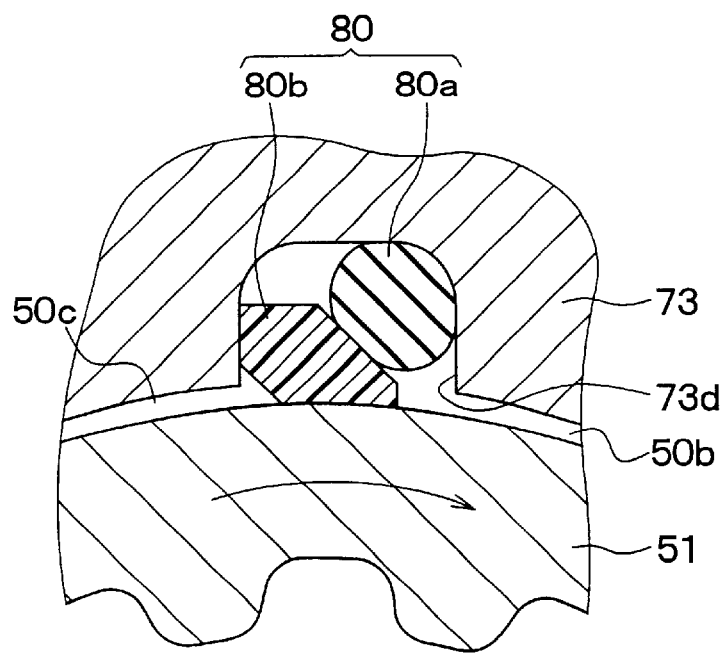
FIG. 10 is a partly enlarged cross sectional view of the rotary pump in a vicinity of circumference sealing member.

FIG. 8 shows a schematic sectional view of a pump according to a second embodiment of the present invention. In FIG. 8, a dot-slash line shows the resin elements 100b and 101b of the side sealing members 100 and 101. FIG. 9 shows across sectional view taken along a line IX—IX of FIG. 8. FIG. 10 shows an enlarged view of a part in the vicinity of the first outer circumference sealing member 80 of FIG. 8. The detail description of the second outer circumference sealing member 81, whose shape is substantially the same as that of the first outer circumference sealing member 80, is not repeated.

The second embodiment has substantially the same structure as that of the first embodiment in a point that the fluid discharge pressure is applied to the first and second outer circumference surfaces 51b and 51c of the outer rotor 51 to deform the outer rotor 51, and, accordingly, the first and second closed region teeth top clearances reduce according to the increase of the fluid discharge pressure.

Though each of the side sealing members 100 and 101 is shaped as a ring whose width is substantially identical in a circular direction according to the first embodiment, width of each of the side sealing members 100 and 101 according to the second embodiment is not identical but partly different to more effectively seal.

In more details, each of the resin elements 100b and 101b of the side sealing members 100 and 101 has partly great width and hangs over all of the teeth gap portions 53 communicating with the discharge port 61, as shown by a dot-slash line in FIG. 8.

As shown in FIG. 9, the resin element 100b or 101b is provided on its surface facing the outer and inner rotors 51 and 52 with a step portion constituted by a recess portion and a protruding portion. The protruding portion contacts parts of the outer and inner rotors 51 and 52 and the center plate 73. The protruding portion is shaded by dot-slash lines in FIG. 8.

The protruding portion of the resin element 100b or 101b arranged between the drive shaft 54 and the discharge port 61 is in contact with the inner rotor 52. As both of the drive shaft 54 and teeth gap portions 53 on the side of the intake port 60 are radially inside the ring shaped resin element 100b, 101b, the brake fluid leakage from the high pressure side of the discharge port 61 to the low pressure side of the clearance between the drive shaft 54 and the inner rotor 52 and to the low pressure side of the intake port 60 may be prevented.

The recess portion of the resin element 100b or 101b hangs over the teeth gap portions 53 communicating with the discharge port 61 so that the teeth gap portions 53 communicating with the discharge port 61 are not sealed by the resin element 100b or 101b. As shown in FIG. 9, the teeth gap portions 53 communicating with the discharge port 61 also communicates with the high pressure outer circumference chamber 50b. That is, the recess portion of the resin element 100b or 101b, which hangs over the teeth gap portion 53 communicating with the discharge port 61, constitutes a port that allows the teeth gap portion 53 communicating with the discharge port 61 to communicate with the high pressure outer circumference chamber 50b. Accordingly, high discharge pressure is applied to the high pressure outer circumference chamber 50b.

The protruding portion of the resin element 100b or 101b is in contact with parts of the inner and outer rotors 52 and 51 around and in a vicinity of the first and second closed regions 53a and 53b so that the first and second closed regions 53a and 53b and the teeth gap portions 53 immediately adjacent to the first and second closed regions 53a and 53b on a side of the discharge port 61 are completely sealed by the resin element 100b or 101b. As mentioned above, at least two teeth gap portions 53 at each of the first and second closed regions 53a and 53b are sealed.

Then, the protruding portion of the resin element 101b or 101b extends from the outer rotor 51 to a portion of the center plate 73 located radially outside the outer rotor 51 on a side of the intake port 60 through the respective outer circumference sealing members 80 and 81, while contacting the outer rotor 51, the outer circumference sealing member 80 and 81 and the center plate 73. Accordingly, a clearance between the axial end surfaces of the outer and inner rotors 51 and 52 and the side plate 71 or 72 is separated into two, the high pressure discharge side and the low pressure intake side, by the side sealing members 100 and 101. A clearance between the inner circumference surface of the center plate 73 and the outer circumference surface of the outer rotor 51 is separated into the high pressure discharge side (the high pressure outer circumference chamber 50b) and the low pressure intake side (the low pressure outer circumference chamber 50c). Since an inner circumferential periphery of the resin element 100b or 101b is arranged to pass radially outside the teeth gap portions 53 on a side of the intake port 60 so that pressure of the teeth gap portions 53 on a side of the intake port 60 is equal to that of the intake port 60.

As mentioned above, only limited portions of the resin elements 100b and 101b necessary for sealing may be in contact with the outer and inner rotors 51 and 52.

Further, the inner and outer rotors 52 and 51 are so assembled that the first closed region 53a is sealed by the resign elements 100b and 101b in contact with the outer and inner rotors 51 and 52 around the first closed region 53a and, on driving the pump, brake fluid delivered to the first closed region 53a can be compressed therein and the compressed brake fluid passes through the first closed region 53a.

On the other hand, the outer rotor 51 is pressed from both upper and lower sides in the drawing, since the high discharge pressure is applied to the outer circumference surfaces of the outer rotor 51 surrounding the first and second closed regions 53a and 53b, so that the teeth top clearance between the inner teeth portion 51a of the outer rotor 51 and the outer teeth portion 52a of the inner rotor 52 may be diminished. This pressing load, if it is too strong, is likely to cause an unusual frictional wear of the inner and outer teeth portions 51a and 52a.

However, the compressed brake fluid passes through the first closed region 53a and the teeth gap portion 53 immediately adjacent to the first closed rejoin 53a so that a pressure in a direction of expanding the teeth top clearance between the inner and outer teeth portions 51a and 52a is operative. Therefore, the load mentioned above is partly cancelled by the expanding pressure so that the unusual frictional wear may be prevented.

Further, since at least two teeth gap portions at each of the first and second closed regions 53a and 53b are completely sealed by the resin elements 100b and 101b, sealing between the high and low pressure sides is assured, even if a contact point (a sealing point) between the inner and outer gear portions 52a and 51a in a vicinity of the first closed region 53a or a torque transmitting point therebetween at the second closed region 53b is shifted or fluctuated due to the rotor dimensional or assembly accuracy deviation.

A first corner of the resin element 80b or 81b of the first or second outer circumferential sealing member 80 or 81 at a facing position to the low pressure outer circumference chamber 50c and a second corner thereof at a position diagonal to the first corner have tapered surfaces.

The rubber element 80a or 81a is in contact with the tapered surface of the second corner in a recessed portion 73d or 73e so that elastic force of the rubber element 80a or 81a is operative not only to press the resign element 80b or 81b to the outer circumference of the outer rotor 51 but also to bring the resin element 80b or 81b in closed contact with an inner wall of the recessed portion 73d or 73e. Further, since the first corner has the tapered surface, the first corner is prevented from cutting into low pressure outer circumference chamber 50c.

(Third embodiment)

Figure 11:
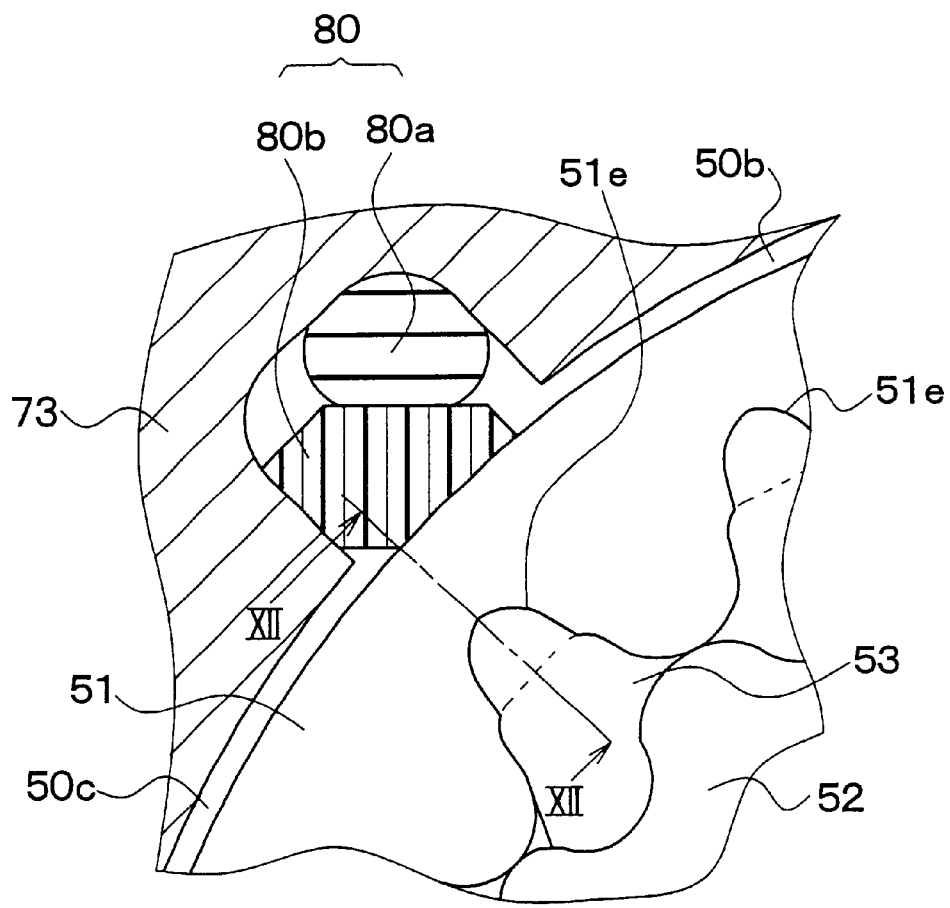
FIG. 11 is a partly enlarged cross sectional view of a rotary pump according to a third embodiment of the present invention.
Figure 12:
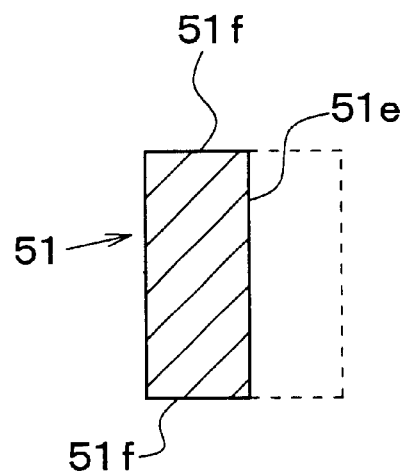
FIG. 12 is a cross sectional view taken along a line XII—XII of FIG. 11.

According to a pump of a third embodiment of the present invention, the stiffness of the outer rotor 51 is relatively low so that the outer rotor 51 is adequately deformed in response to increase of the discharge pressure P. The other features and constructions of the third embodiment are the same as those of the first or second embodiment. FIG. 11 shows a partly enlarged cross sectional view of a rotary pump in a vicinity of the outer rotor 51. FIG. 12 shows a cross sectional view taken along a line XII—XII of FIG. 11.

It is a general idea that a shape or dimension of a teeth bottom of the outer rotor is defined based on a locus (interference line) of the teeth top of the inner rotor 52, when the inner rotor 52 rotates together with the outer rotor 51, in such a manner that the teeth bottom of the outer rotor 51 never interferes with the teeth top of the inner rotor 52 at the second closed region 53b but a clearance between the teeth bottom of the outer rotor 51 and the teeth top of the inner rotor 52 is not too large.

However, according to the third embodiment, the teeth bottom 51e of the outer rotor 51 is hollowed to position radially more outside than a position (a position shown by a broken line in the drawing) to be generally defined based on the locus of the teeth top of the inner rotor as mentioned above. Accordingly, a thickness (length) between the teeth bottom 51e of the outer rotor 51 and the outer circumference surface thereof is thinner (shorter) than usual so that the stiffness of the outer rotor 51 is relatively low. The thickness between the teeth bottom 51e of the outer rotor 51 and the outer circumference surface thereof is defined to a given value so as to deform adequately the outer rotor 51.

(Fourth embodiment)

Figure 13:
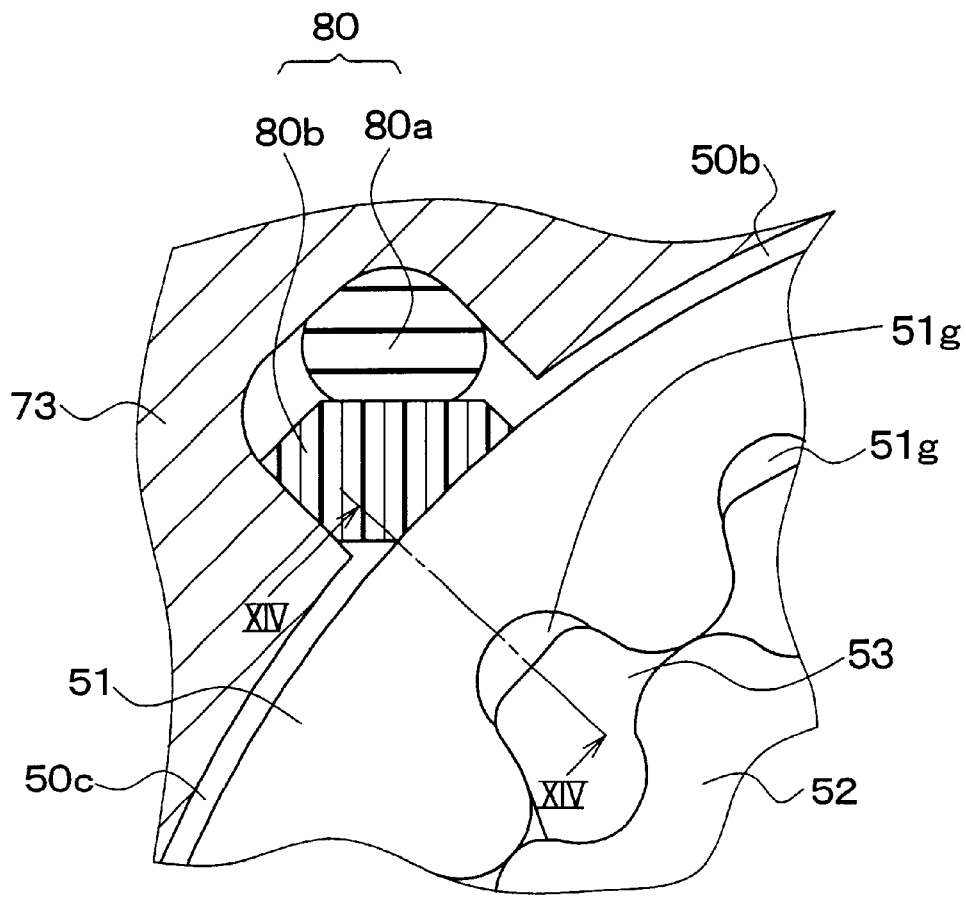
FIG. 13 is a partly enlarged cross sectional view of a rotary pump according to a fourth embodiment of the present invention.
Figure 14:
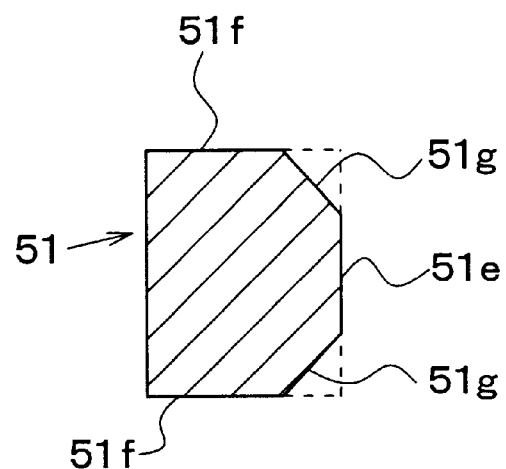
FIG. 14 is a cross sectional view taken along a line XIV—XIV of FIG. 13.

According to a pump of a fourth embodiment of the present invention, the stiffness of the outer rotor 51 is relatively low so that the outer rotor 51 is adequately deformed in response to increase of the discharge pressure P. The other features and constructions of the fourth embodiment are the same as those of the first or second embodiment. FIG. 13 shows a partly enlarged cross sectional view of a rotary pump in a vicinity of the outer rotor 51. FIG. 14 shows a cross sectional view taken along a line XIV—XIV of FIG. 13.

According to the fourth embodiment, the outer rotor 51 has a chamfering portion 51g at a corner corresponding to each teeth bottom 51e among corners constituted by the inner circumference surface of the outer rotor and the opposite axial end surfaces thereof so that the stiffness of the outer rotor 51 is relatively low. The chamfering portion 51g whose largeness is adequately set brings a preferable deformation of the outer rotor 51 in response to increase of the discharge pressure P.

Though it is not preferable in view of a pump efficiency to provide the chamfering portion at the corner of the teeth top or teeth base of the outer rotor 51, the chamfering portion 51g provided at the corner corresponding to the teeth bottom 51e does not adversely affect on the pump efficiency.

Figure 15:
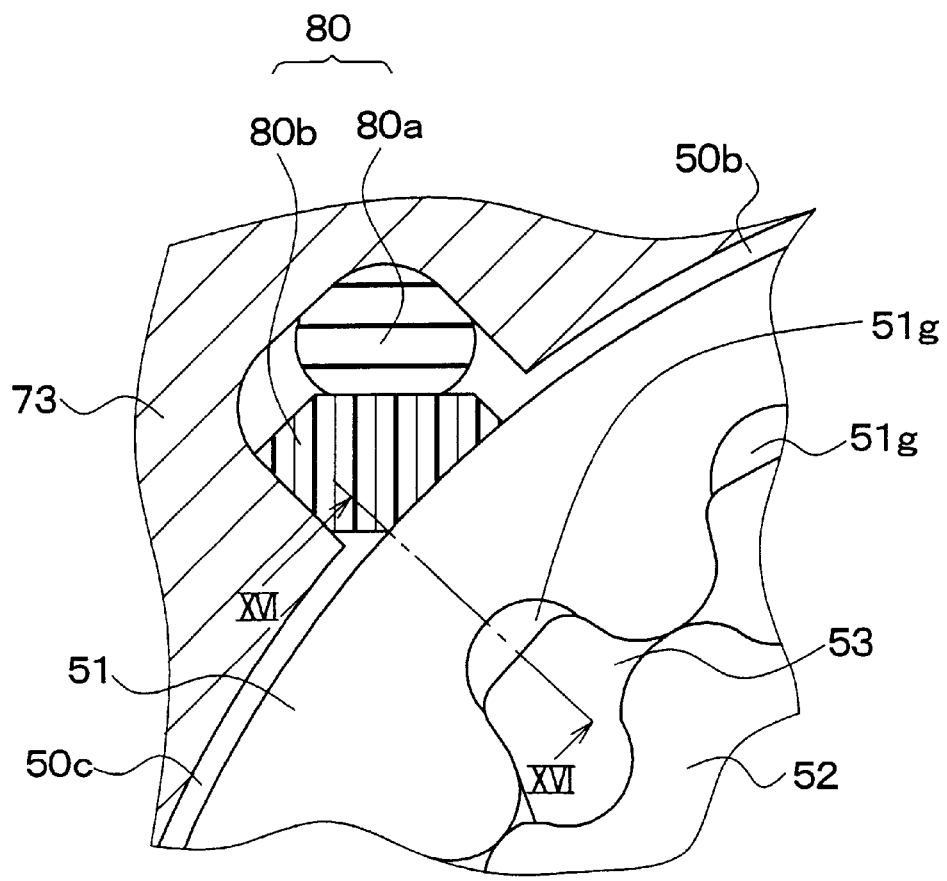
FIG. 15 is a cross sectional view of a rotary pump modified from the fourth embodiment.
Figure 16:
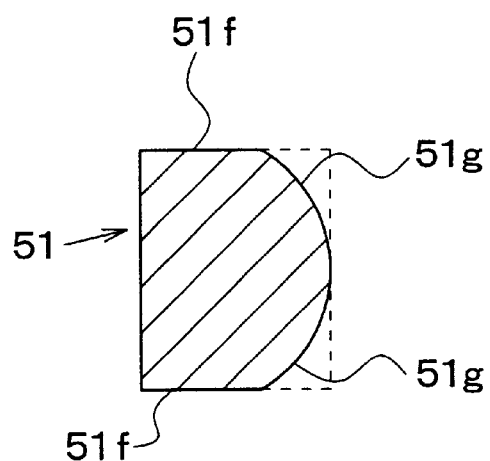
FIG. 16 is a cross sectional view taken along a line XVI—XVI of FIG. 15.

FIG. 15 shows a partly enlarged cross sectional view of a rotary pump in a vicinity of the outer rotor 51. FIG. 16 shows a cross sectional view taken along a line XVI—XVI of FIG. 15.

The chamfering portion 51g may be a rounded corner as shown in FIGS. 15 and 16.

(Fifth embodiment)

Figure 17:
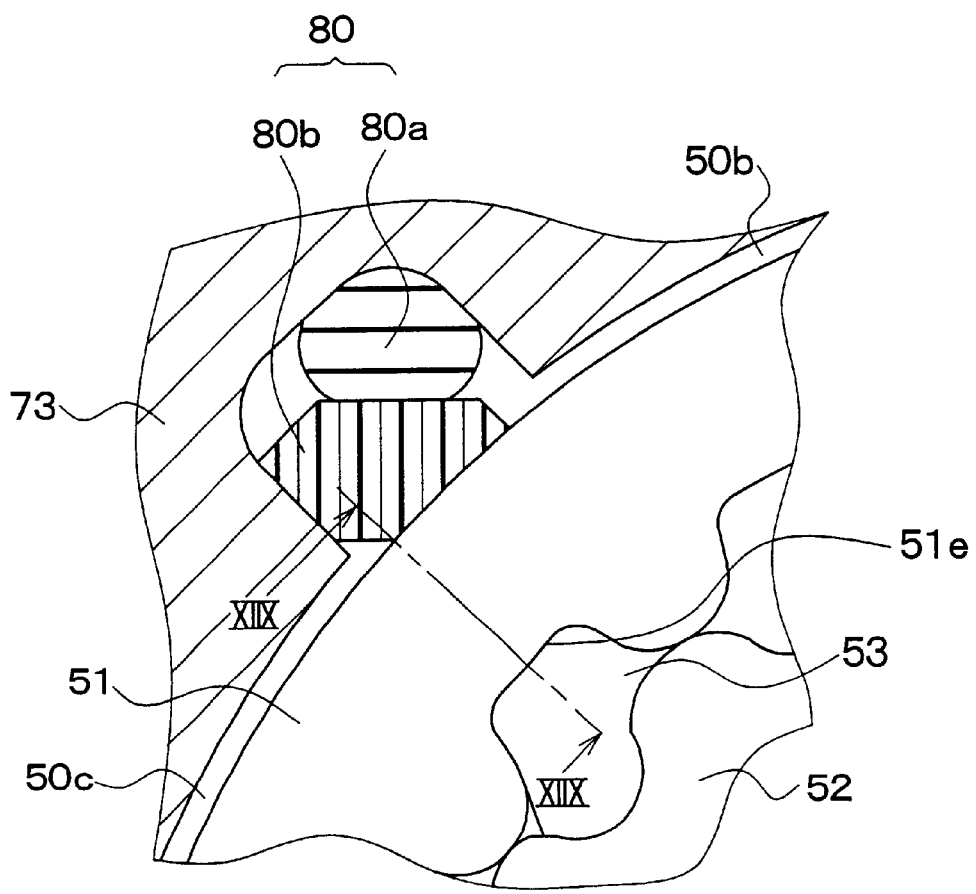
FIG. 17 is a partly enlarged cross sectional view of a rotary pump according to a fifth embodiment of the present invention.
Figure 18:
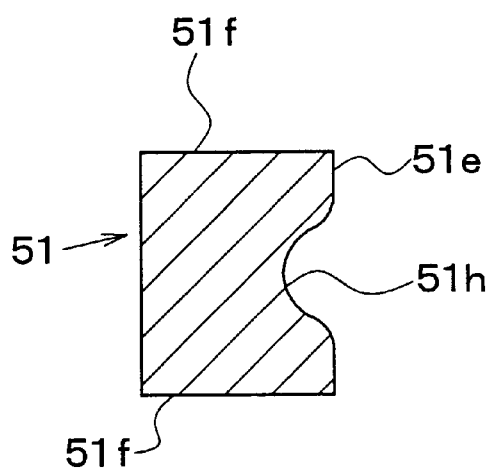
FIG. 18 is a cross sectional view taken along a line XVIII—XVIII of FIG. 17.

According to a pump of a fifth embodiment of the present invention, the stiffness of the outer rotor 51 is relatively low so that the outer rotor 51 is adequately deformed in response to increase of the discharge pressure P. The other features and constructions of the fifth embodiment are the same as those of the first or second embodiment. FIG. 17 shows a partly enlarged cross sectional view of a rotary pump in a vicinity of the outer rotor 51. FIG. 18 shows a cross sectional view taken along a line XVIII—XVIII of FIG. 17.

According to the fifth embodiment, the outer rotor 51 has a recess 51h at an axial near middle point of each teeth bottom 51e so that the stiffness of the outer rotor 51 is relatively low. The recess 51h whose largeness is adequately set brings a preferable deformation of the outer rotor 51 in response to increase of the discharge pressure P.

(Sixth embodiment)

Figure 19:
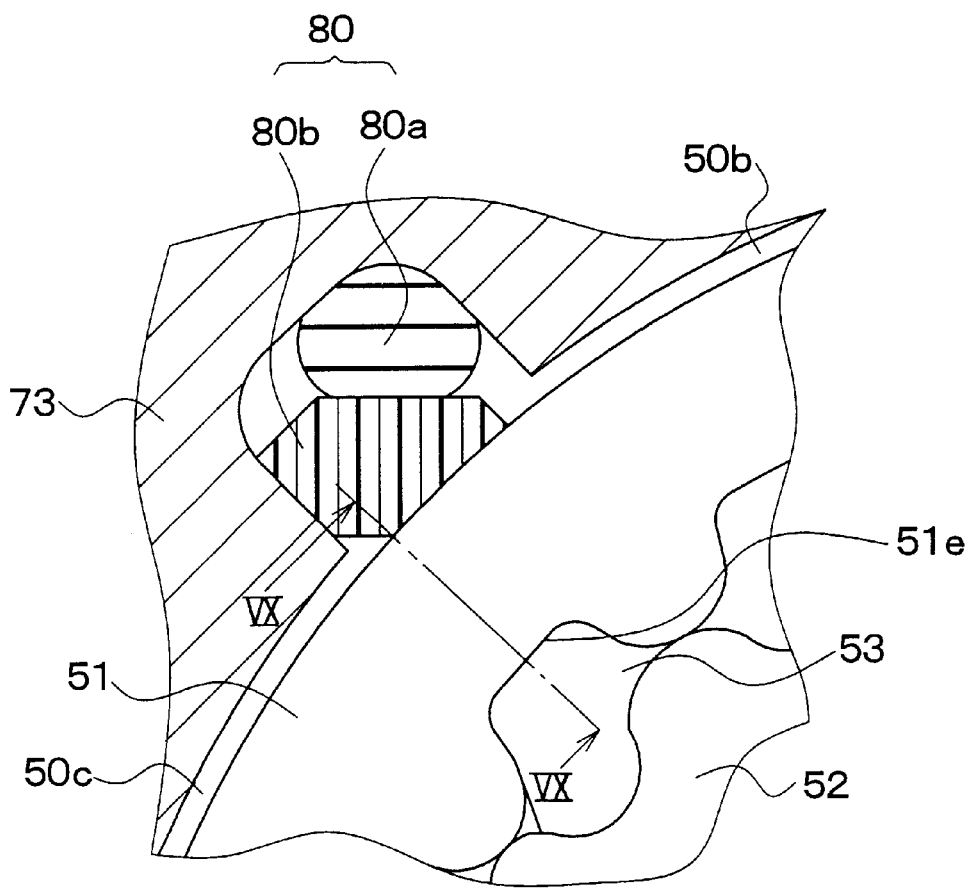
FIG. 19 is a partly enlarged cross sectional view of a rotary pump according to a sixth embodiment of the present invention.
Figure 20:
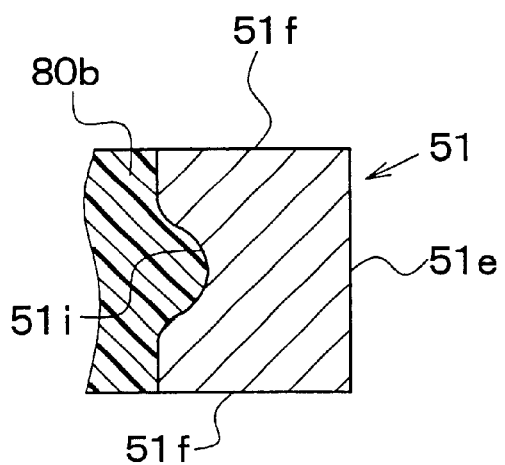
FIG. 20 is a cross sectional view taken along a line XX—XX of FIG. 19.

According to a pump of a sixth embodiment of the present invention, the stiffness of the outer rotor 51 is relatively low so that the outer rotor 51 is adequately deformed in response to increase of the discharge pressure P. The other features and constructions of the sixth embodiment are the same as those of the first or second embodiment. FIG. 19 shows a partly enlarged cross sectional view of a rotary pump in a vicinity of the outer rotor 51. FIG. 20 shows a cross sectional view taken along a line XX—XX of FIG. 19.

According to the sixth embodiment, the outer rotor 51 has a ring shaped groove 51i at an axial near middle point of the outer circumferential surface thereof so that the stiffness of the outer rotor 51 is relatively low. The ring shaped groove 51i whose largeness is adequately set brings a preferable deformation of the outer rotor 51 in response to increase of the discharge pressure P.

(Seventh embodiment)

Figure 21:
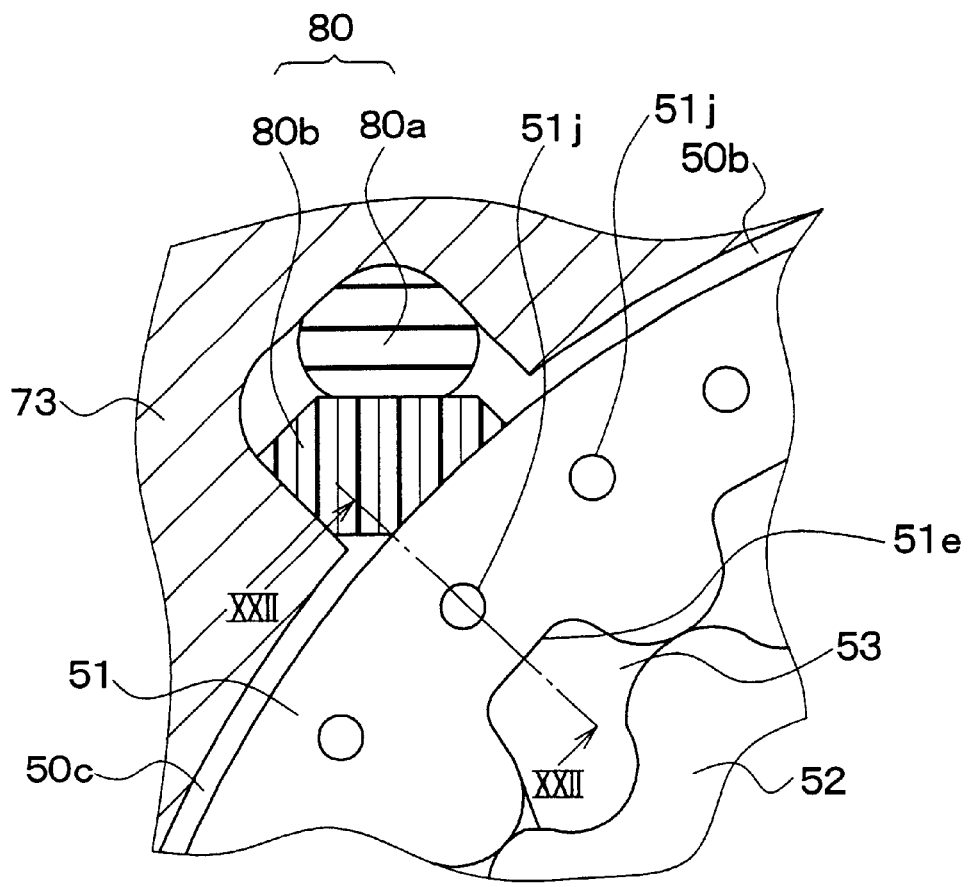
FIG. 21 is a partly enlarged cross sectional view of a rotary pump according to a seventh embodiment of the present invention.
Figure 22:
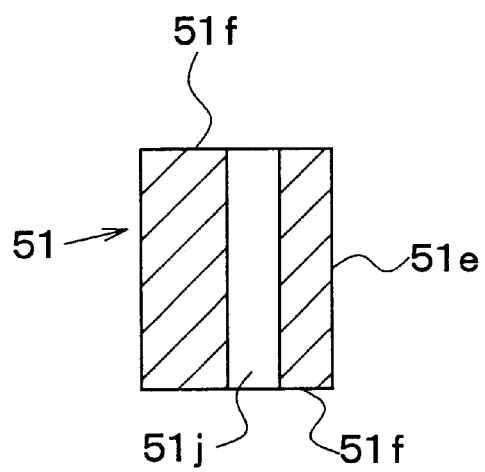
FIG. 22 is a cross sectional view taken along a line XXII—XXII of FIG. 21.

According to a pump of a seventh embodiment of the present invention, the stiffness of the outer rotor 51 is relatively low so that the outer rotor 51 is adequately deformed in response to increase of the discharge pressure P. The other features and constructions of the seventh embodiment are the same as those of the first or second embodiment. FIG. 21 shows a partly enlarged cross sectional view of a rotary pump in a vicinity of the outer rotor 51. FIG. 22 shows a cross sectional view taken along a line XXII—XXII of FIG. 22.

According to the seventh embodiment, the outer rotor has a plurality of axial through-holes 51j so that the stiffness of the outer rotor 51 is relatively low. The axial through-holes 51j whose each largeness (diameter) or piece number is adequately set brings a preferable deformation of the outer rotor 51 in response to increase of the discharge pressure P.

To secure a sealing effect of the side sealing member 100 or 101 (refer to FIG. 3), each diameter of the axial through-holes 51j is shorter than a width of the side sealing member 100 or 101.

(Eighth embodiment)

Figure 23:
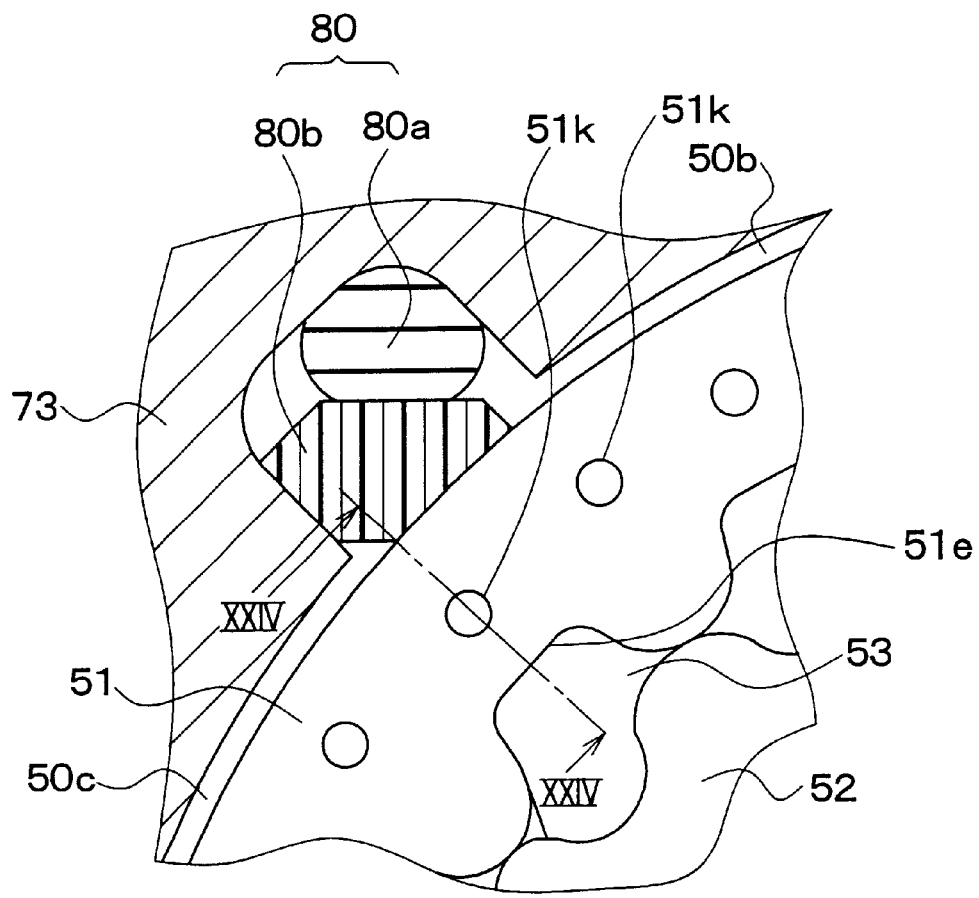
FIG. 23 is a partly enlarged cross sectional view of a rotary pump according to an eighth embodiment of the present invention.
Figure 24:
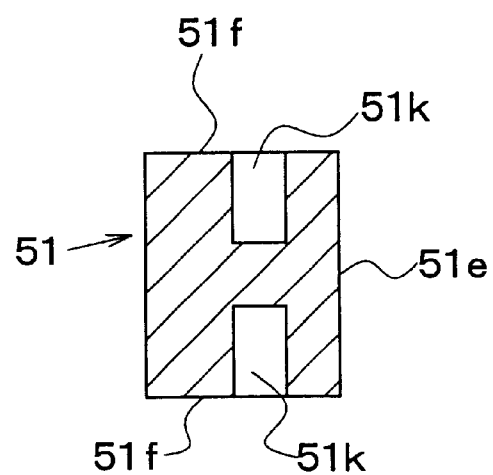
FIG. 24 is a cross sectional view taken along a line XXIV—XXIV of FIG. 23.

According to a pump of an eighth embodiment of the present invention, the stiffness of the outer rotor 51 is relatively low so that the outer rotor 51 is adequately deformed in response to increase of the discharge pressure P. The other features and constructions of the eighth embodiment are the same as those of the first or second embodiment. FIG. 23 shows a partly enlarged cross sectional view of a rotary pump in a vicinity of the outer rotor 51. FIG. 24 shows a cross sectional view taken along a line XXIV—XXIV of FIG. 24.

According to the eighth embodiment, the outer rotor has a plurality of round holes 51k on opposite axial end surfaces thereof so that the stiffness of the outer rotor 51 is relatively low. The round holes 51k whose each largeness (diameter), piece number or depth is adequately set brings a preferable deformation of the outer rotor 51 in response to increase of the discharge pressure P.

To secure a sealing effect of the side sealing member 100 or 101 (refer to FIG. 3), each diameter of the round holes 51k is shorter than a width of the side sealing member 100 or 101.

According to the embodiments mentioned above, discharge pressure is applied to given parts of the outer circumference surface of the outer rotor 51 so as to deform the outer rotor 51, thereby reducing each of the first and second closed region teeth top clearances in response to increase of the discharge pressure. However, instead of the discharge pressure, a mechanical load such as spring biasing forces may be applied to the given parts of the outer circumference of the outer rotor to deform the outer rotor. The mechanical load whose value is proportional to the increase of the discharge pressure serves to reduce each of the first and second closed region teeth top clearances in response to the increase of the discharge pressure.

As deformation assist means for lowering the stiffness of the outer rotor, a plurality of deformation assist means shown in the third to eighth embodiments may be combined.

What is claimed is:

1. A rotary pump comprising:

an outer rotor provided with inner teeth at an inner circumference thereof;

an inner rotor provided with outer teeth at an outer circumference thereof, the outer teeth being in mesh with the inner teeth so as to constitute a plurality of teeth gap portions therebetween, the teeth gap portions having a first closed region whose teeth gap volume is largest and a second closed region whose teeth gap volume is smallest;

a drive shaft fitted to the inner rotor for rotating the inner rotor together with the drive shaft; and a casing provided with a rotor room in which the inner and outer rotors are rotatably contained with an outer circumference clearance between an inner circumferential surface of the rotor room and an outer circumferential surface of the outer rotor, and intake and discharge ports communicating respectively with the teeth gap portions, wherein fluid is sucked from the intake port, compressed through the teeth gap portions and discharged from the discharge port when the drive shaft is driven, while fluid pressure difference between the intake and discharge ports is maintained by limiting brake fluid leakage though a teeth top clearance between the outer and lower teeth at the first and second closed regions, and wherein the outer rotor has deformation assist means for allowing the rotor to deform, when the fluid is discharged from the discharge port, so that the teeth top clearance of at least one of the first and second closed regions is narrowed, and wherein the teeth gap portions communicating with the intake port has a first low pressure teeth gap portion adjacent to the first closed region, a second low pressure teeth gap portion adjacent to the second closed region and a third low pressure teeth gap portion provided between the first and second low pressure teeth gap portions, and the fluid discharge pressure is applied to a first outer circumference surface that is positioned radially outside the first low pressure teeth gap portion and a second outer circumference surface that is positioned radially outside the second low pressure teeth gap portion at the outer circumference surface of the outer rotor so that the first and second outer circumference surfaces are pressed radially inward to deform the outer rotor due to pressure difference between the high pressure outer circumference chamber and the first or second low pressure teeth gap portion.

2. A rotary pump according to claim 1, wherein the outer rotor deforms, when the fluid is discharged from the discharge port, so that the teeth top clearances of both of the first and second closed regions are narrowed.

3. A rotary pump according to claim 1, wherein, as the discharge pressure increases, deformation of the outer rotor increases so that the teeth top clearance of at least one of the first and second closed regions is more narrowed.

4. A rotary pump according to claim 1, wherein a deforming amount of the outer rotor depends on the fluid discharge pressure, and each teeth top clearance of the first and second closed regions at a zero fluid discharge pressure is set in advance so as to satisfy a condition, Q>QL, where Q is a theoretical fluid discharge amount per rotation and QL is a fluid leakage amount per rotation through both of the first and second closed regions.

5. A rotary pump according to claim 1, wherein the rotary pump is included in a brake apparatus comprising:
   a brake fluid pressure generating device for generating fluid pressure in accordance with brake pedal depression;
   a braking force producing device for producing braking force on wheels; and
   a main conduit being connected to the brake fluid pressure generating device for transmitting the fluid pressure to the braking force producing device,
   wherein the rotary pump discharges brake fluid to the main conduit so as to increase the fluid pressure applied to the braking force producing device.

6. A rotary pump according to claim 1, wherein the outer circumference clearance constitutes high pressure and low pressure outer circumference chambers which communicate with the discharge and intake ports, respectively, and the fluid discharge pressure of the high pressure outer circumference chamber is applied to the first and second outer circumference surfaces.

7. A rotary pump according to claim 6, wherein the fluid intake pressure of the low pressure outer circumference chamber is applied to a third outer circumference surface of the outer rotor that is positioned radially outside the third low pressure teeth gap portion so that the outer rotor is easily deformable radially outward at the third outer circumference surface and radially inward at the first and second outer circumference surfaces.

8. A rotary pump according to claim 7, wherein the outer circumference clearance is provided with sealing members for preventing the fluid from flowing between the high and low pressure outer circumference chambers.

9. A rotary pump according to claim 1, wherein the deformation assist means is each hollow teeth bottom of the outer rotor so that the teeth bottom of the outer rotor is positioned radially more outside than a locus of each teeth top of the inner rotor.

10. A rotary pump according to claim 1, wherein the deformation assist means is a chamfering portion at a corner corresponding to each teeth bottom among corners constituted by the inner circumference surface of the outer rotor and the opposite axial end surfaces thereof.

11. A rotary pump according to claim 1, wherein the deformation assist means is a recess at an axial near middle point of each teeth bottom of the outer rotor.

12. A rotary pump according to claim 1, wherein the deformation assist means is a ring shaped groove at an axial near middle point of the outer circumferential surface.

13. A rotary pump according to claim 1, wherein the deformation assist means is a plurality of axial through-holes provided in the outer rotor.

14. A rotary pump according to claim 1, wherein the deformation assist means is a plurality of round holes on opposite axial end surfaces of the outer rotor.

15. A rotary pump comprising:
   an outer rotor provided with inner teeth at an inner circumference thereof, wherein the outer rotor is made of a non-resin material;
   an inner rotor provided with outer teeth at an outer circumference thereof, the outer teeth being in mesh with the inner teeth so as to constitute a plurality of teeth gap portions therebetween, the teeth gap portions having a first closed region whose teeth gap volume is largest and a second closed region whose teeth gap volume is smallest;
   a drive shaft fitted to the inner rotor for rotating the inner rotor together with the drive shaft; and
   a casing provided with a rotor room in which the inner and outer rotors are rotatably contained with an outer circumference clearance between an inner circumferential surface of the rotor room and an outer circumferential surface of the outer rotor, and intake and discharge ports communicating respectively with the teeth gap portions, wherein:
      fluid is sucked from the intake port, compressed through the teeth gap portions and discharged from the discharge port when the drive shaft is driven, while fluid pressure difference between the intake and discharge ports is maintained by limiting brake fluid leakage though a teeth top clearance between the outer and lower teeth at the first and second closed regions; and
      the outer rotor has deformation assist means for allowing the rotor to deform, when the fluid is discharged from the discharge port, so that the teeth too clearance of at least one of the first and second closed regions is narrowed, wherein a deformation amount of the outer rotor depends on the fluid discharge pressure, and each teeth top clearance of the first and second closed regions at a zero fluid discharge pressure is set in advance so as to satisfy a condition, Q>QL, where Q is a theoretical fluid discharge amount per rotation and QL is a fluid leakage amount per rotation through both of the first and second closed regions.

16. A rotary pump comprising:
   an outer rotor provided with inner teeth at an inner circumference thereof, wherein the outer rotor is made of a non-resin material;
   an inner rotor provided with outer teeth at an outer circumference thereof, the outer teeth being in mesh with the inner teeth so as to constitute a plurality of teeth gap portions therebetween, the teeth gap portions having a first closed region whose teeth gap volume is largest and a second closed region whose teeth gap volume is smallest;

a drive shaft fitted to the inner rotor for rotating the inner rotor together with the drive shaft; and a casing provided with a rotor room in which the inner and outer rotors are rotatably contained with an outer circumference clearance between an inner circumferential surface of the rotor room and an outer circumferential surface of the outer rotor, and intake and discharge ports communicating respectively with the teeth gap portions, wherein:

fluid is sucked from the intake part, compressed through the teeth gap portions and discharged from the discharge port when the drive shaft is driven, while fluid pressure difference between the intake and discharge ports is maintained by limiting brake fluid leakage though a teeth top clearance between the outer and lower teeth at the first and second closed regions; and the outer rotor has deformation assist means for allowing the rotor to deform, when the fluid is discharged from the discharge port, so that the teeth top clearance of at least one of the first and second closed regions is narrowed, wherein the teeth gap portions communicating with the intake port include a first low pressure teeth gap portion adjacent to the first closed region, a second low pressure teeth gap portion adjacent to the second closed region and a third low pressure teeth gap portion provided between the first and second low pressure teeth gap portions, and the fluid discharge pressure is applied to a first outer circumference surface that is positioned radially outside the first low pressure teeth gap portion and a second outer circumference surface that is positioned radially outside the second low pressure teeth gap portion at the outer circumference surface of the outer rotor so that the first and second outer circumference surfaces are pressed radially inward to deform the outer rotor due to a pressure difference between the high pressure outer circumference chamber and the first or second low pressure teeth gap portion.

17. A rotary pump comprising:

an outer rotor provided with inner teeth at an inner circumference thereof;

an inner rotor provided with outer teeth at an outer circumference thereof, the outer teeth being in mesh with the inner teeth so as to constitute a plurality of teeth gap portions therebetween, the teeth gap portions having a first closed region whose teeth gap volume is largest and a second closed region whose teeth gap volume is smallest;

a drive shaft fitted to the inner rotor for rotating the inner rotor together with the drive shaft; and a casing provided with a rotor room in which the inner and outer rotors are rotatably contained with an outer circumference clearance between an inner circumferential surface of the rotor room and an outer circumferential surface of the outer rotor, and intake and discharge ports communicating respectively with the teeth gap portions, wherein:

fluid is drawn from the intake port, compressed through the teeth gap portions and discharged from the discharge port when the drive shaft is driven, while fluid pressure difference between the intake and discharge ports is maintained by limiting brake fluid leakage though a teeth top clearance between the outer and lower teeth at the first and second closed regions;

the outer rotor has deformation assist means for allowing the rotor to deform, when the fluid is discharged from the discharge port, so that the teeth top clearance of at least one of the first and second closed regions is narrowed, and the outer circumference clearance is provided with resin sealing members for preventing the fluid from flowing between the high and low pressure outer circumference chambers, and the inner and outer rotor are made of a non-resin material.

18. A rotary pump according to claim 17, wherein the outer rotor is made of metal.

* * * * *